(12) United States Patent
Zhou et al.

(10) Patent No.: US 11,669,443 B2
(45) Date of Patent: Jun. 6, 2023

(54) DATA LAYOUT OPTIMIZATION ON PROCESSING IN MEMORY ARCHITECTURE FOR EXECUTING NEURAL NETWORK MODEL

(71) Applicant: ALIBABA GROUP HOLDING LIMITED, Grand Cayman (KY)

(72) Inventors: Minxuan Zhou, San Mateo, CA (US); Guoyang Chen, San Mateo, CA (US); Weifeng Zhang, San Mateo, CA (US)

(73) Assignee: Alibaba Group Holding Limited, Grand Cayman (KY)

( * ) Notice: Subject to any disclaimer, the term of this patent is extended or adjusted under 35 U.S.C. 154(b) by 552 days.

(21) Appl. No.: 16/746,419

(22) Filed: Jan. 17, 2020

(65) Prior Publication Data
US 2021/0224185 A1 Jul. 22, 2021

(51) Int. Cl.
G06F 12/02 (2006.01)
G06F 9/30 (2018.01)
G06F 9/50 (2006.01)
G06F 17/16 (2006.01)
G06N 3/06 (2006.01)

(52) U.S. Cl.
CPC ...... *G06F 12/0246* (2013.01); *G06F 9/30036* (2013.01); *G06F 9/5016* (2013.01); *G06F 12/0207* (2013.01); *G06F 17/16* (2013.01); *G06N 3/06* (2013.01); *G06F 2212/7202* (2013.01)

(58) Field of Classification Search
CPC .......................... G06F 9/30036; G06F 9/5016
See application file for complete search history.

(56) References Cited

U.S. PATENT DOCUMENTS

| | | | | |
|---|---|---|---|---|
| 2020/0119735 | A1* | 4/2020 | Finkbeiner | G06F 3/0625 |
| 2020/0174749 | A1* | 6/2020 | Kang | G06N 3/08 |
| 2021/0117761 | A1* | 4/2021 | Ro | G06N 3/0481 |
| 2021/0216243 | A1* | 7/2021 | Shin | G06N 3/02 |

OTHER PUBLICATIONS

Shafiee, Ali et al. "ISAAC: A Convolutional Neural Network Accelerator with In-Situ Analog Arithmetic in Crossbars", Proceedings of the 43$^{rd}$ International Symposium on Computer Architecture, 2016, 13 pages.

(Continued)

*Primary Examiner* — Edward J Dudek, Jr.
(74) *Attorney, Agent, or Firm* — Finnegan, Henderson, Farabow, Garrett & Dunner, LLP

(57) ABSTRACT

The present disclosure relates to a method for scheduling a computation graph on a processing in memory (PIM) enabled device comprising a memory block assembly. The method comprises allocating a first node of the computation graph on a first memory block of a first array of memory blocks in the memory block assembly and allocating a second node of the computation graph on a second memory block of a second array of memory blocks in the memory block assembly, wherein output data of the first node is used for executing the second node. The memory block assembly can be configured to support data transfer from the first memory block to the second memory block via an internal data coupling in the memory block assembly.

17 Claims, 19 Drawing Sheets

(56) References Cited

OTHER PUBLICATIONS

Chi, Ping et al. "Prime: A Novel Processing-in-Memory Architecture for Neural Network Computation in ReRAM-Based Main Memory", Proceedings of the $43^{rd}$ International Symposium on Computer Architecture, 2016, 13 pages.

Song, Linghao et al. "A Pipelined ReRAM-Based Accelerator for Deep Learning", High Performance Computer Architecture (HPCA), 2017, 13 pages.

Imani, Mohsen, et al. "FloatPIM: In-Memory Acceleration of Deep Neural Network Training with High Precision", Proceedings of the $46^{rd}$ International Symposium on Computer Architecture, 2019, pp. 802-815.

\* cited by examiner

| Src | Dst | Bfr |
|---|---|---|
| ... | ... | ... |

| State | #Rec | #Send |
|-------|------|-------|
| ... | ... | |

$$\begin{bmatrix} H_1 & H_2 & H_3 & H_4 \end{bmatrix} = \begin{bmatrix} W_{11} & W_{12} & W_{13} & W_{14} \\ W_{21} & W_{22} & W_{23} & W_{24} \\ W_{31} & W_{32} & W_{33} & W_{43} \\ W_{41} & W_{42} & W_{43} & W_{44} \end{bmatrix} \times \begin{bmatrix} X_1 \\ X_2 \\ X_3 \\ X_4 \end{bmatrix}$$

$H = W \times X$

DATA LAYOUT OPTIMIZATION ON PROCESSING IN MEMORY ARCHITECTURE FOR EXECUTING NEURAL NETWORK MODEL

BACKGROUND

Machine learning has been widely used in various areas including natural language processing, speech recognition, image classification, etc. In machine learning, neural network models have been constantly increasing and becoming more complicated. As neural network models, especially deep neural network (DNN) models, become large and complex with hundreds of layers and millions of weights, executing neural network models becomes not only computation heavy but also memory intensive. Because conventional Von Neumann architecture has separate processing units and memory units, a large amount of data transfers between the processing units and memory units occur when processing neural network models on conventional Von Neumann architecture, which becomes a bottleneck in processing the neural network models.

Processing In-Memory (PIM) technology, which enables computation to be performed in memory units, has emerged to resolve such problems by reducing data movements between processing units and memory units. Optimizing data layout on PIM architecture is important in order to achieve a higher level of parallelism as well as scalability in executing larger neural network models and to improve overall execution performance.

SUMMARY OF THE DISCLOSURE

Embodiments of the present disclosure provide a method for scheduling a computation graph on a processing in memory (PIM) enabled device comprising a memory block assembly. The method comprises allocating a first node of the computation graph on a first memory block of a first array of memory blocks in the memory block assembly and allocating a second node of the computation graph on a second memory block of a second array of memory blocks in the memory block assembly, wherein output data of the first node is used for executing the second node. The memory block assembly can be configured to support data transfer from the first memory block to the second memory block via an internal data coupling in the memory block assembly.

Embodiments of the present disclosure provide an apparatus for scheduling a computation graph on a processing in memory (PIM) enabled device comprising a memory block assembly. The apparatus comprises a memory storing a set of instructions and one or more processors configured to execute the set of instructions to cause the apparatus to perform: allocating a first node of the computation graph on a first memory block of a first array of memory blocks in the memory block assembly and allocating a second node of the computation graph on a second memory block of a second array of memory blocks in the memory block assembly, wherein output data of the first node is used for executing the second node. The memory block assembly can be configured to support data transfer from the first memory block to the second memory block via an internal data coupling in the memory block assembly.

Embodiments of the present disclosure provide a non-transitory computer readable medium that stores a set of instructions that is executable by at least one processor of a computing device to cause the computing device to perform a method for scheduling a computation graph on a processing in memory (PIM) enabled device comprising a memory block assembly. The method comprises allocating a first node of the computation graph on a first memory block of a first array of memory blocks in the memory block assembly and allocating a second node of the computation graph on a second memory block of a second array of memory blocks in the memory block assembly, wherein output data of the first node is used for executing the second node. The memory block assembly can be configured to support data transfer from the first memory block to the second memory block via an internal data coupling in the memory block assembly.

Embodiments of the present disclosure provide a terminal comprising a processing in memory (PIM) enabled device comprising a memory block assembly and a host unit, which is communicatively coupled to the PIM enabled device, for scheduling a computation graph on the PIM enabled device. The host unit comprises a memory storing a set of instructions and one or more processors configured to execute the set of instructions to cause the host unit to perform: allocating a first node of the computation graph on a first memory block of a first array of memory blocks in the memory block assembly and allocating a second node of the computation graph on a second memory block of a second array of memory blocks in the memory block assembly, wherein output data of the first node is used for executing the second node. The memory block assembly is configured to support data transfer from the first memory block to the second memory block via an internal data coupling in the memory block assembly.

Additional features and advantages of the disclosed embodiments will be set forth in part in the following description, and in part will be apparent from the description, or may be learned by practice of the embodiments. The features and advantages of the disclosed embodiments may be realized and attained by the elements and combinations set forth in the claims.

It is to be understood that both the foregoing general description and the following detailed description are exemplary and explanatory only and are not restrictive of the disclosed embodiments, as claimed.

BRIEF DESCRIPTION OF THE DRAWINGS

FIG. 5A illustrates an exemplary data transfer table for recording data transfer, consistent with embodiments of the present disclosure.

FIG. 5B illustrates an exemplary block table for recording a memory block status, consistent with embodiments of the present disclosure.

FIG. 8A illustrates an example of a vector-matrix multiplication operation.

FIG. 9A illustrates an example of a convolution operation.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims.

Figure 1:
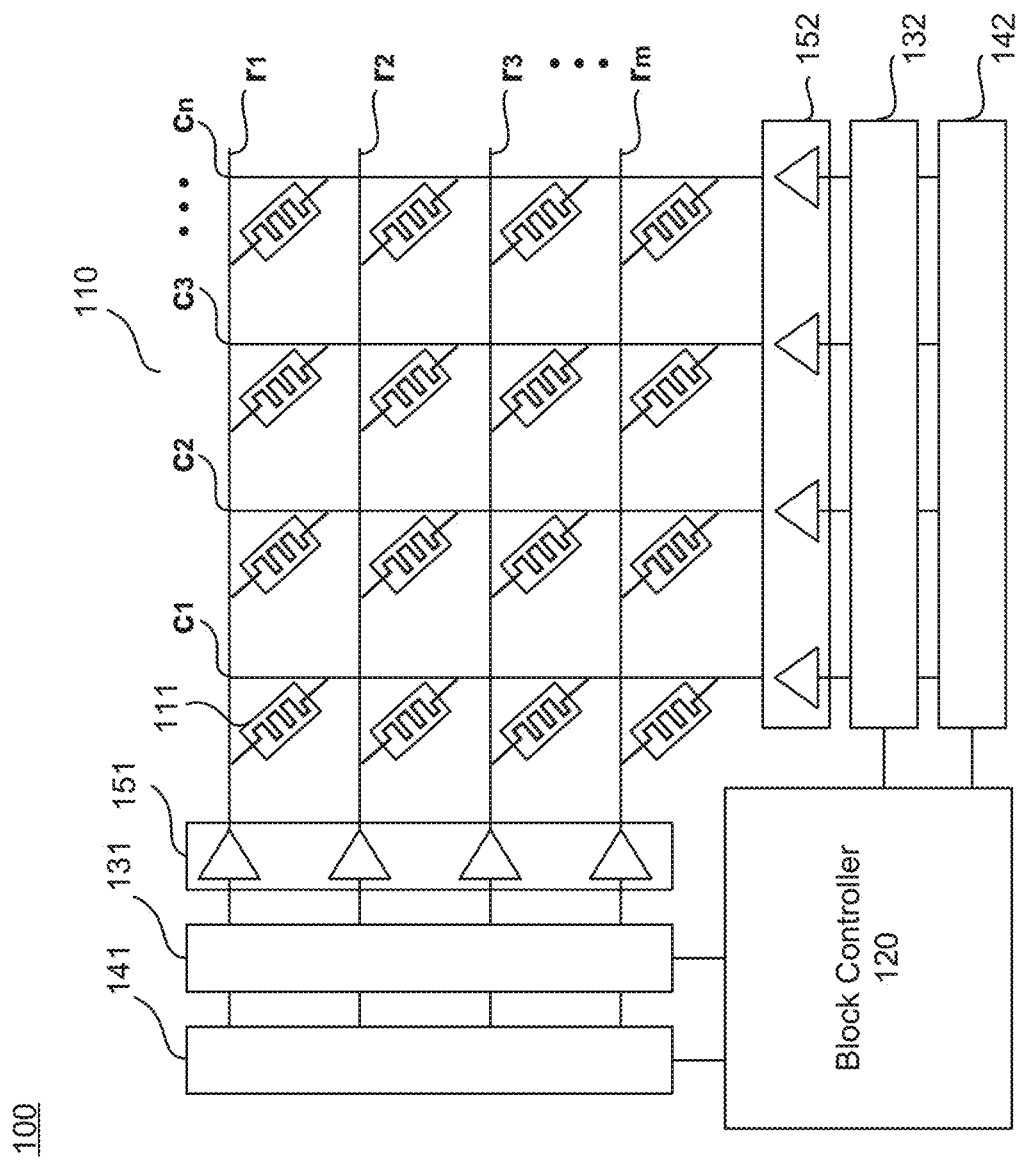
FIG. 1 illustrates an exemplary processing in memory block configuration, consistent with embodiments of the present disclosure.

FIG. 1 illustrates an exemplary processing in memory (PIM) block configuration, consistent with embodiments of the present disclosure. PIM block 100 includes a memory cell array 110, a block controller 120, a block row driver 131, and a block column driver 132. Although some embodiments will be illustrated using ReRAM (resistive random access memory) as examples, it will be appreciated that PIM block 100 according to embodiments of the present disclosure can be implemented based on various memory technologies including DRAM (dynamic random access memory), SRAM (static random access memory), ReRAM, etc.

Memory cell array 110 may include m number of rows $r_1$ to $r_m$ and n number of columns $c_1$ to $c_n$. As shown in FIG. 1, a crossbar memory 111 can be connected between each of m number of rows $r_1$ to $r_m$ and each of n number of columns $c_1$ to $c_n$. In some embodiments, data can be stored as multi-bit memristors in crossbar memory 111.

Block row driver 131 and block column driver 132 may provide signals such as voltage signals to m number of rows $r_1$ to $r_m$ and n number of columns $c_1$ to $c_n$ for processing corresponding operations. In some embodiments, block row driver 131 and block column driver 132 may be configured to pass analog signals through crossbar memory 111. In some embodiments, the analog signals may have been converted from digital input data.

Block controller 120 may include an instruction register for storing instructions. In some embodiments, instructions may include instructions of when block row driver 131 or block column driver 132 provides signals to a corresponding column or row, which signals are to be provided, etc. Block controller 120 can decode instructions stored in the register into signals to be used by block row driver 131 or block column driver 132.

PIM block 100 may further include a row sense amplifier 141 or a column sense amplifier 142 for read out data from a memory cell or for storing the data into a memory cell. In some embodiments, row sense amplifier 141 and column sense amplifier 142 may store data for buffering. In some embodiments, PIM block 100 can further include DAC 151 (digital-to-analog converter) or ADC 152 (analog-to-digital converter) to convert input signal or output data between analog domain and digital domain. In some embodiments of the present disclosure, row sense amplifier 141 or column sense amplifier 142 can be omitted because computations in PIM block 100 may be performed directly on the stored values in the memory cell without reading the values out or without using any sense amplifier.

According to embodiments of the present disclosure, PIM block 100 enables parallel computing by using memories as multiple SIMD (single instruction, multiple data) processing units. PIM block 100 may support computational operations including bit-wise operations, additions, subtractions, multiplications, and divisions for both integer and floating-point values. For example, in memory cell array 110 of FIG. 1, a first column $c_1$ and a second column $c_2$ can store a first vector A and a second vector B, respectively. A vector operation result C from the addition of vectors A and B can be stored in a third column $c_3$ by applying formatted signals to the first to third columns $c_1$ to $c_3$ and corresponding rows for a length of the vectors A, B, and C. Similarly, memory cell array 110 of FIG. 1 can also support vector multiplication and addition operations. For example, computation C=aA+bB can be performed by applying a voltage signal corresponding to a multiplier a to a first column $c_1$ and a voltage signal corresponding to a multiplier b to a second column $c_2$ and by applying formatted signals to corresponding columns and rows to perform an addition operation and to save a result C in a third column $c_3$.

In some embodiments, one vector can be stored in multiple columns for representing n-bit values for elements. For example, one vector of which element has 2-bit values can be stored in two columns of memory cells. In some embodiments, when the length of a vector exceeds the number of rows of memory cell array 110, which constitutes a memory block, the vector may be stored in multiple memory blocks. The multiple memory blocks may be configured to compute different vector segments in parallel. While embodiments in which PIM architecture performs computational operations without using arithmetic logics addition to memory cells, the present disclosure may also apply to PIM architecture including arithmetic logics for performing arithmetic operations in PIM architecture.

PIM architecture can be used in processing neural network models to address data movement overhead between processing units and memory units. As shown before, computational operations such as addition, multiplication, etc., can also be performed as column-wise vector calculations in PIM architecture, it is important to align data properly before processing such operations in memory to reduce unnecessary data movement in memory and to maximize utilization of a computing capacity of PIM architecture. The disclosed embodiments provide data layout optimization and node allocation techniques that can maximize parallelism and resource utilization in executing neural network models on PIM accelerator architecture.

Figure 2A:
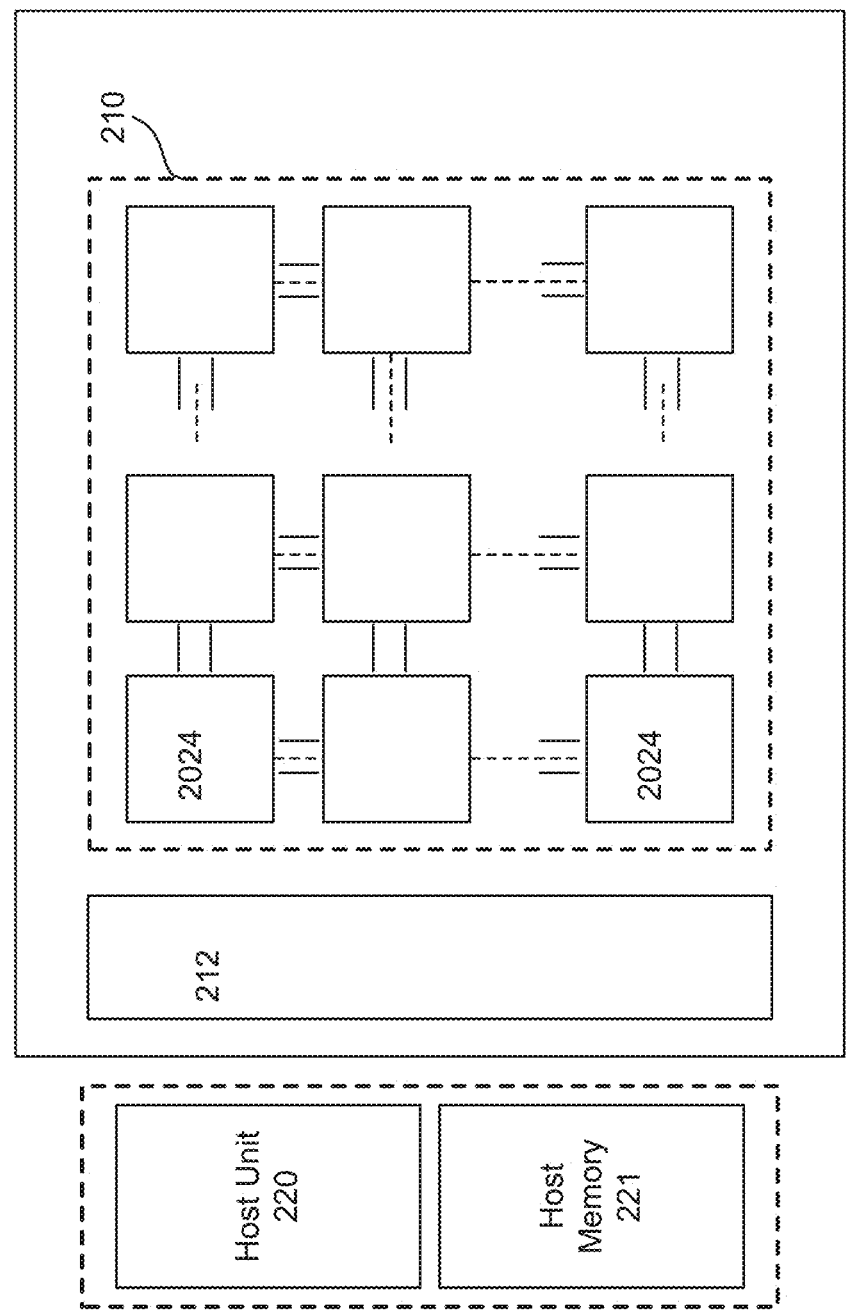
FIG. 2A illustrates an exemplary neural network accelerator architecture, consistent with embodiments of the present disclosure.

FIG. 2A illustrates an exemplary neural network accelerator architecture 200, consistent with embodiments of the present disclosure. In the context of this disclosure, a neural network accelerator may also be referred to as a machine learning accelerator or deep learning accelerator. In some embodiments, accelerator architecture 200 may be referred to as a neural network processing unit (NPU) architecture 200. As shown in FIG. 2A, accelerator architecture 200 can include a PIM accelerator 210, an interface 212, and the like. It is appreciated that, PIM accelerator 210 can perform algorithmic operations based on communicated data.

PIM accelerator 210 can include one or more memory tiles 2024. In some embodiments, memory tiles 2024 can include a plurality of memory blocks for data storage and computation. A memory block can be configured to perform one or more operations (e.g., multiplication, addition, multiply-accumulate, etc.) on the communicated data. In some embodiments, each of memory blocks included in memory tile 2024 may have the same configuration of PIM block 100 shown in FIG. 1. Due to a hierarchical design of PIM accelerator 210, PIM accelerator 210 can provide generality and scalability. PIM accelerator 210 may comprise any number of memory tiles 2024 and each memory tile 2024 may have any number of memory blocks.

Interface 212 (such as a PCIe interface) serves as an (and typically the) inter-chip bus, providing communication between the PIM accelerator 210 and the host unit 220. The inter-chip bus connects the PIM accelerator 210 with other devices, such as the off-chip memory or peripherals. In some embodiments, accelerator architecture 200 can further include a DMA unit (not shown) that assists with transferring data between host memory 221 and PIM accelerator 210. In addition, DMA unit can assist with transferring data between multiple accelerators. DMA unit can allow off-chip devices to access both on-chip and off-chip memory without causing a host CPU interrupt. Thus, DMA unit can also generate memory addresses and initiate memory read or write cycles. DMA unit also can contain several hardware registers that can be written and read by the one or more processors, including a memory address register, a byte-count register, one or more control registers, and other types of registers. These registers can specify some combination of the source, the destination, the direction of the transfer (reading from the input/output (I/O) device or writing to the I/O device), the size of the transfer unit, and/or the number of bytes to transfer in one burst. It is appreciated that accelerator architecture 200 can include a second DMA unit, which can be used to transfer data between other accelerator architecture to allow multiple accelerator architectures to communicate directly without involving the host CPU.

While accelerator architecture 200 of FIG. 2A is explained to include PIM accelerator 210 having memory blocks (e.g., PIM memory block 100 of FIG. 1), it is appreciated that the disclosed embodiments may be applied to any type of memory blocks, which support arithmetic operations, for accelerating some applications such as deep learning.

Accelerator architecture 200 can also communicate with a host unit 220. Host unit 220 can be one or more processing unit (e.g., an X86 central processing unit). PIM accelerator 210 can be considered as a coprocessor to host unit 220 in some embodiments.

As shown in FIG. 2A, host unit 220 may be associated with host memory 221. In some embodiments, host memory 221 may be an integral memory or an external memory associated with host unit 220. Host memory 221 may be a local or a global memory. In some embodiments, host memory 221 may comprise a host disk, which is an external memory configured to provide additional memory for host unit 220. Host memory 221 can be a double data rate synchronous dynamic random-access memory (e.g., DDR SDRAM) or the like. Host memory 221 can be configured to store a large amount of data with slower access speed, compared to the on-chip memory of PIM accelerator 210, acting as a higher-level cache. The data stored in host memory 221 may be transferred to PIM accelerator 210 to be used for executing neural network models.

In some embodiments, a host system having host unit 220 and host memory 221 can comprise a compiler (not shown). The compiler is a program or computer software that transforms computer codes written in one programming language into instructions to create an executable program. In machine learning applications, a compiler can perform a variety of operations, for example, pre-processing, lexical analysis, parsing, semantic analysis, conversion of input programs to an intermediate representation, code optimization, and code generation, or combinations thereof.

In some embodiments, the compiler may push one or more commands to host unit 220. Based on these commands, host unit 220 can assign any number of tasks to one or more memory tiles (e.g., memory tile 2024) or processing elements. Some of the commands may instruct a DMA unit to load instructions and data from host memory (e.g., host memory 221 of FIG. 2A) into accelerator (e.g., PIM accelerator 210 of FIG. 2A). The instructions may be loaded to each memory tile (e.g., memory tile 2024 of FIG. 2A) assigned with the corresponding task, and the one or more memory tiles may process these instructions.

It is appreciated that the first few instructions may instruct to load/store data from the host memory 221 into one or more local memories of the memory tile. Each memory tile may then initiate the instruction pipeline, which involves fetching the instruction (e.g., via a fetch unit) from the local memory, decoding the instruction (e.g., via an instruction decoder) and generating local memory addresses (e.g., corresponding to an operand), reading the source data, executing or loading/storing operations, and then writing back results.

Figure 2B:
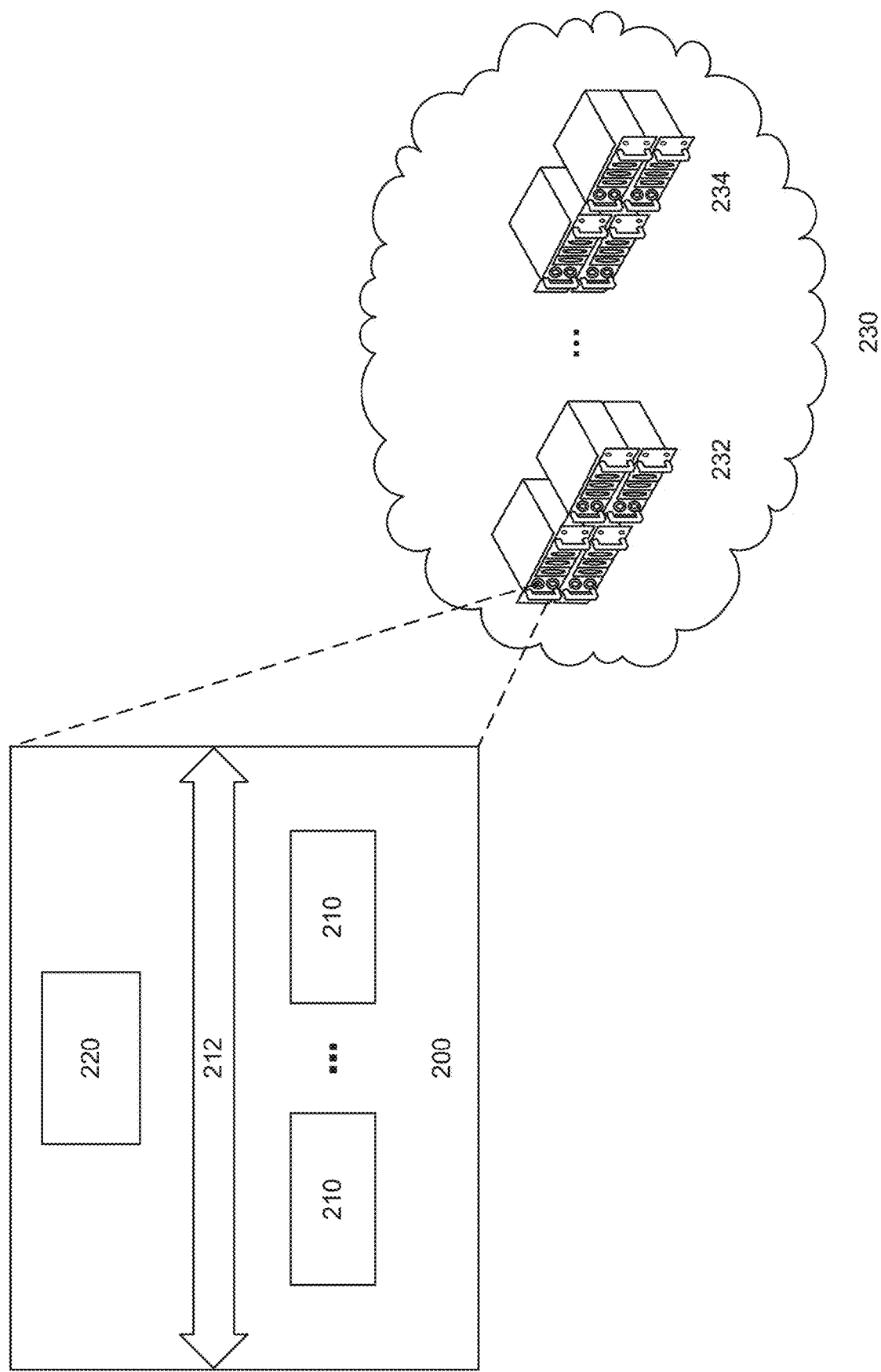
FIG. 2B illustrates a schematic diagram of an exemplary cloud system incorporating a neural network accelerator architecture, consistent with embodiments of the present disclosure.

FIG. 2B illustrates a schematic diagram of an exemplary cloud system incorporating a neural network accelerator architecture, consistent with embodiments of the present disclosure. As shown in FIG. 2B, cloud system 230 can provide a cloud service with artificial intelligence (AI) capabilities and can include a plurality of computing servers (e.g., 232 and 234). In some embodiments, a computing server 232 can, for example, incorporate a neural network accelerator architecture 200 of FIG. 2A. Neural network accelerator architecture 200 is shown in FIG. 2B in a simplified manner for simplicity and clarity.

With the assistance of a neural network accelerator architecture 200, cloud system 230 can provide the extended AI capabilities of image recognition, facial recognition, translations, 3D modeling, and the like. It is appreciated that, neural network accelerator architecture 200 can be deployed to computing devices in other forms. For example, neural network accelerator architecture 200 can also be integrated in a computing device, such as a smart phone, a tablet, and a wearable device.

Figure 3:
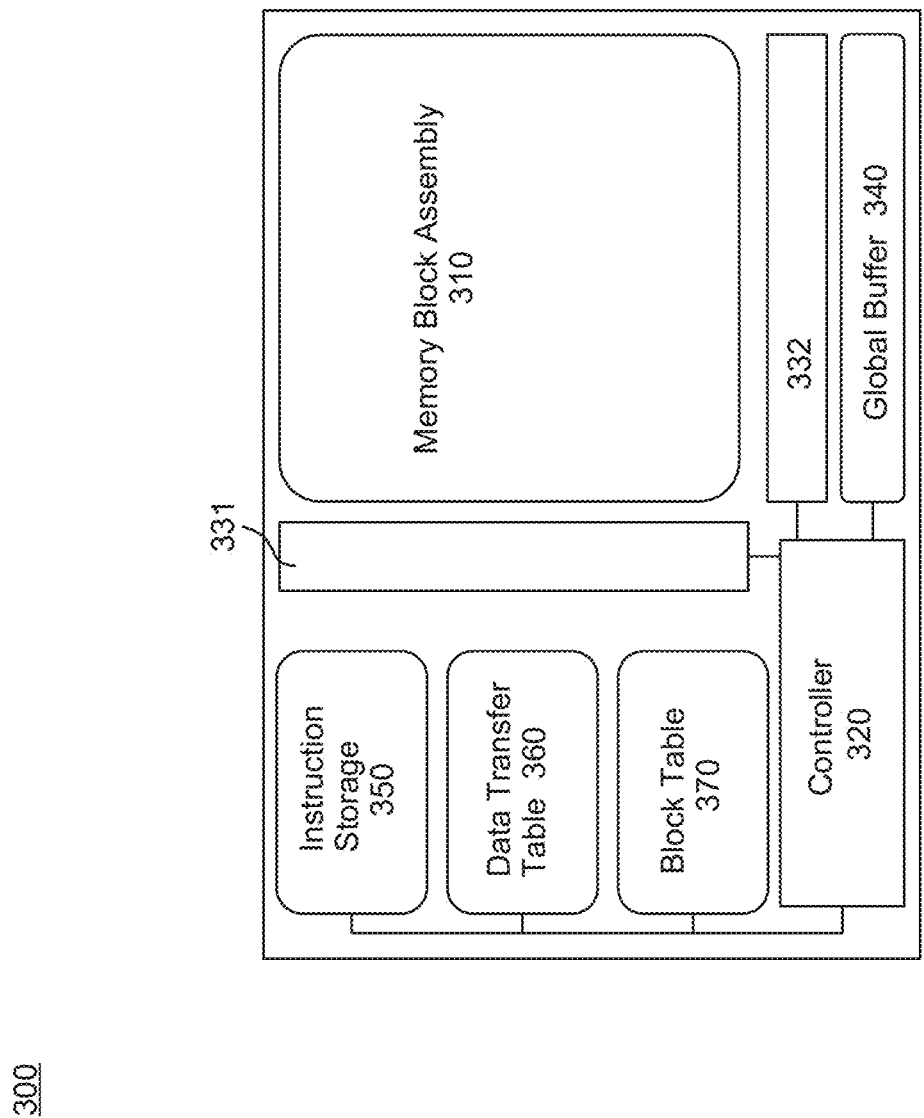
FIG. 3 illustrates an exemplary memory tile configuration, consistent with embodiments of the present disclosure.

FIG. 3 illustrates an exemplary memory tile configuration, consistent with embodiments of the present disclosure. A memory tile 300 may include a memory block assembly 310, a controller 320, a row driver 331, a column driver 332, and a global buffer 340.

Memory block assembly 310 may include a plurality of memory blocks arranged in a two-dimensional mesh consistent with embodiments of the present disclosure, which will be explained in detail referring to FIG. 4 later.

Controller 320 can provide commands to each memory block in memory block assembly 310 via row driver 331, column driver 332, and global buffer 340. Row driver 331 is connected to each row of memory blocks in memory block assembly 310 and column driver 332 is connected to each column of memory blocks in memory block assembly 310. In some embodiments, block controller (e.g., block controller 120 in FIG. 1) included in each memory block may be configured to receive commands via row drive 331 or column driver 332 from the controller 320 and to issue signals to a block row driver (e.g., block row driver 131 in FIG. 1) and a block column driver (e.g., block column driver 132 in FIG. 1) to perform corresponding operations in memory. According to embodiments of the present disclosure, memory blocks can perform different operations independently by using block controllers belonging to the memory blocks of memory block assembly 310, and thus block-level parallel processing can be performed. Data can be efficiently transferred among memory cells arranged in rows and in columns in the corresponding memory block by the block controller.

In some embodiments, global buffer 340 can be used to transfer data between memory blocks in memory block assembly 310. For example, controller 320 can use global buffer 340 when transferring data from one memory block to another memory block in memory block assembly 310. According to some embodiments of the present disclosure, global buffer 340 can be shared by all memory blocks in memory block assembly 310. Global buffer 340 can be configured to store commands for each memory block to process assigned tasks in processing neural network model. In some embodiments, controller 320 is configured to send commands stored in global buffer 340 to corresponding memory blocks via row driver 331 and column driver 332. In some embodiments, such commands can be transferred from host unit (e.g., host unit 220 of FIG. 2A). Global buffer 340 can be configured to store and send data to be used for processing assigned tasks to memory blocks. In some embodiments, the data stored in and sent from global buffer 340 can be transferred from host unit (e.g., host unit 220 of FIG. 2A) or other memory blocks in memory block assembly 310. In some embodiments, controller 320 is configured to store data from memory blocks in memory block assembly 310 into global buffer 340. In some embodiments, controller 320 can receive and store data of an entire row of one memory block in memory block assembly 310 into global buffer 340 in one cycle. Similarly, controller 320 can send data of an entire row from global buffer 340 to another memory block in one cycle.

Figure 4:
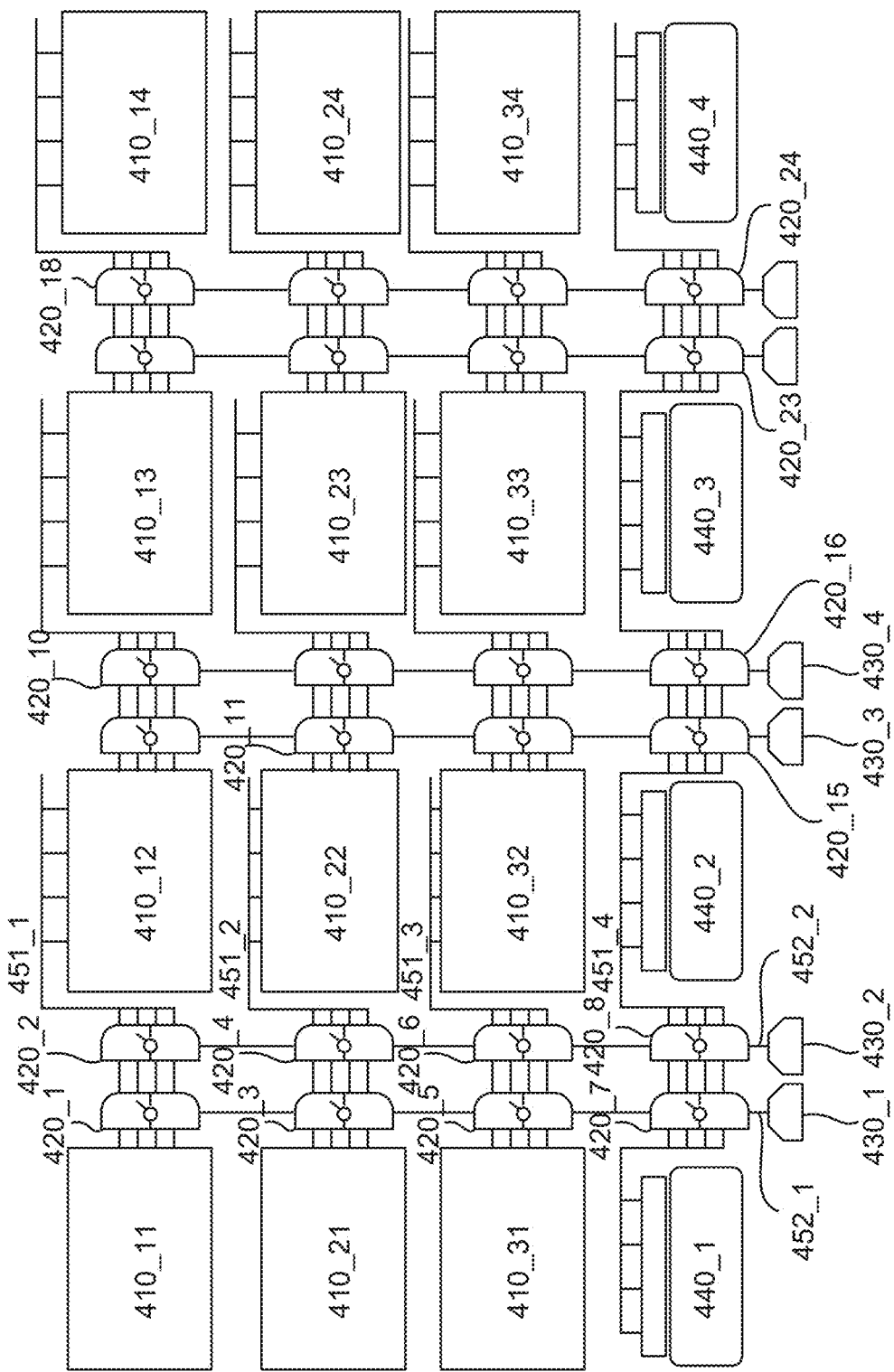
FIG. 4 illustrates an exemplary memory block assembly in memory tile, consistent with embodiments of the present disclosure.

Reference is now made to FIG. 4 illustrating an exemplary memory block assembly 310 in memory tile 300 consistent with embodiments of the present disclosure. Memory block assembly 310 may include a plurality of memory blocks 410, a plurality of switches 420, and a plurality of selectors 430.

According to embodiments of the present disclosure, operations for processing neural network models in PIM architecture can be transformed to in-memory column-wise vector calculations. In-memory column-wise vector calculations, output data of a certain neural network layer or neural network operation may be stored as a set of column-wise vectors in memory block 410. Memory block assembly 310 can be configured to support or facilitate column-wise vector calculation in order to minimize unnecessary data movements within memory block assembly 310 and to maximize memory utilization while executing neural network models. In some embodiments, a plurality of memory blocks 410 in memory block assembly 310 can be interconnected to facilitate data movement between memory blocks, which enables the memory block assembly 310 to be suitable and efficient for processing vector calculations. A plurality of memory blocks 410 can be arranged in a 2D mesh. In some embodiments, a plurality of memory blocks 410 can be arranged in M number of rows and N number of columns in memory block assembly 310, where M and N are natural numbers greater than 1. Each memory block 410 may be positioned at each intersection of rows and columns. While FIG. 4 illustrates that 12 memory blocks 410_11 to 410_34 are arranged in 3 rows and 4 columns as an example, it will be appreciated that memory block assembly 310 can have any number of memory blocks and can be arranged in any manner. In some embodiments, each memory block 410 can be a PIM block (e.g., PIM block 100 of FIG. 1). In some embodiments, memory block 410 is a basic computation unit for performing various in-memory operations.

According to embodiments of the present disclosure, a row data link 451 interconnects two adjacent memory blocks in the same row among a plurality of memory blocks 410. For example, as shown in FIG. 4, first memory block 410_11 and second memory block 410_12 placed adjacent in a first row are connected with row data link 451_1 and fifth memory block 410_21 and sixth memory block 410_22 placed adjacent in a second row are connected with row data link 451_2. Similarly, two adjacent memory blocks in the same row can be interconnected with their own row data link.

According to embodiments of the present disclosure, memory block assembly 310 may further include a column data link connecting a plurality of row data links positioned between two adjacent columns of memory blocks among the plurality of memory blocks 410. For example, as shown in FIG. 4, two column data links 452_1 and 452_2 connect three row data links 451_1 to 451_3 that are positioned between the first column of memory blocks 410_11 to 410_31 and the second column of memory blocks 410_12 to 410_32. In some embodiments, via column data links 452 and row data links 451 between two adjacent columns of memory blocks, one column of memory blocks among the two adjacent columns of memory blocks can share data with the other column of memory blocks. For example, column data links 452_1 or 452_2 enable the first column of memory blocks 410_11 to 410_31 to share data with the entire second column of memory blocks 410_12 to 410_31 by cooperating with row data links 451_1 to 451_3.

According to embodiments of the present disclosure, switches 420 can be provided for each row data link 451. For example, a first switch 420_1 and a second switch 420_2 can be provided for row data link 451_1 and a third switch 420_3 and a fourth switch 420_4 can be provided for row data link 451_2. In some embodiments, each switch 420 is configured to open or close a data path from/to an adjacent memory block to the switch 420 in the same row to/from the corresponding data link 451. For example, when first switch 420_1 is turned on, a data path from first memory block 410_11 to row data link 451_1 is open. In this example, data from first memory block 410_11 can be transferred through row data links 451_1, 451_2, and 451_3 and column data links 452_1 and 452_2. In the same example, when second switch 420_2 is turned on, a data path from row data link 451_1 to second memory block 410_12 is open. In this example, the data shared through row data links 451_1, 451_2, and 451_3 and column data links 452_1 and 452_2 can be transferred to the second memory block 410_2.

According to some embodiments of the present disclosure, a selector 430 is provided for a plurality of switches in the same column. For example, a first selector 430_1 is provided for a first column of switches 420_1, 420_3, and 420_5 and a second selector 430_2 is provided for a second column of switches 420_2, 420_4, and 420_6. In some embodiments, selector 430 can be configured to select switch to turn on among the plurality of switches in the corresponding column. For example, first selector 430_1 can be configured to select switch among the plurality of switches 420_1, 420_3, and 420_5 in the first column to turn on and second selector 430_2 can be configured to select switch among the plurality of switches 420_2, 420_4, and 420_6 in the second column to turn on.

When data from first memory block 410_11 needs to be transferred to $10^{th}$ memory block 410_32, first selector 430_1 may select first switch 420_1 to turn on and second selector 430_2 may select sixth switch 420_6 to turn on. In this example, a data path from first memory block 410 to row data link 451_1 is open by turning on the first switch 420_1 and data from the first memory block 410 is accessible to a second column of memory blocks 410_12, 410_22, and 410_32 via two column data links 452_1 and 452_2 and row data links 451_1, 451_2, and 451_3. Because only the sixth switch 420_6 is selected to turn on and thus a data path from row data link 451_3 to $10^{th}$ memory block 410_32 is open, the data from the first memory block 410 can be transferred to the $10^{th}$ memory block 410_32.

According to some embodiments of the present disclosure, one memory block to multiple memory blocks data transfer can be supported. Selector 430 controlling a data path from row data link 451 to adjacent memory block 410 may select more than one switch at a time (e.g., in one cycle) to transfer data to multiple memory blocks 410. For example, in the above example, second selector 430_2 may select second switch 420_2 and sixth switch 420_6 to transfer data from the first memory block 410_11 to two memory blocks 410_12 and 410_32 at a same cycle. In the present disclosure, embodiments in which one switch is selected in one cycle will be explained. In these embodiments, data transfer from one memory block to many memory blocks (aka 'one to many' data transfer) may be performed during multiple cycles. For example, in the above example, second selector 430_2 may select second switch 420_2 in a first cycle and sixth switch 420_6 in a second cycle while first selector 430_1 selects first switch 420_1 in the first and second cycles to transfer data from first memory block 410_11 to two memory blocks 410_12 and 410_32.

According to some embodiments, when data is transferred from one memory block to another memory block, values stored in one column of memory cells in the transferring memory block can be stored in one row of memory cells in the receiving memory block. For example, when data is transferred from first memory block 410_11 to $10^{th}$ memory block 410_32, values stored in one column of memory cells (e.g., a column of memory cells storing an output vector) in the first memory block 410_11 can be stored in one row of memory cells in the $10^{th}$ memory block 410_32. In some embodiments, data from an entire column of memory cells in memory block (e.g., 410_11) can be transferred to one or more neighboring memory blocks (e.g., 410_12 and 410_32) in one cycle. In some embodiments, transfer latency may depend on the size of each element in a vector.

As discussed above, operations for processing neural network models in PIM architecture can be transformed to in-memory column-wise vector calculations. In-memory column-wise vector calculations, output data of a certain neural network layer or neural network operation may be stored as a set of column-wise vectors in memory block. According to some embodiments of the present disclosure, global buffer 340 may be suitable for transferring data stored in a row of memory cells and may show optimal performance when entire data stored in one row of memory cells are moved at one cycle. Transferring a column-wise vector through global buffer 340 may require a sequence of transfers for each element of the vector. Moving data through global buffer 340 shared with all the memory blocks 410 may cause serious conflicts, which may degrade the system throughput. According to embodiments of the present disclosure, via data links 451 and 452, data transfer between neighboring memory blocks can be performed without using global buffer 340, which improves data transfer performance between neighboring memory blocks as well as overall throughput in executing neural network models on PIM accelerator 210.

According to embodiments of the present disclosure, memory block assembly 310 may further include a transfer buffer 440 for transferring data between non-neighboring memory blocks 410. In some embodiments, transfer buffer 440 can be provided to a column of memory blocks. For example, a first transfer buffer 440_1 may be provided to a first column of memory blocks 410_11, 410_21, and 410_31, a second transfer buffer 440_2 may be provided to a second column of memory blocks 410_12, 410_22, and 410_32, a third transfer buffer 440_3 may be provided to a third column of memory blocks 410_12, 410_23, and 410_33, and a fourth transfer buffer 440_4 may be provided to a fourth column of memory blocks 410_14, 410_24, and 410_34. Similar to memory blocks, row data link 451_4 extends between two adjacent transfer buffers 440_1 and 440_2 and two column data links 452_1 and 452_2 extend to the row data link 451_4 between the first column of memory blocks and the second column of memory blocks. In some embodiments, transfer buffer 440 may only have a row buffer to store data in a row of memory cells. When data needs to be transferred from first memory block 410_11 in a first column to third memory block 410_13 in a third column, first selector 430_1 may select the first switch 420_1 to turn on and second selector 430_2 may select eighth switch 420_8 to turn on in a first cycle. In the first cycle, data from the first memory block 410_11 can be stored in a row buffer of second transfer buffer 440_2. In a second cycle, third selector 430_3 may select $15^{th}$ switch 420_15 to turn on and fourth selector 430_4 may select $10^{th}$ switch 420_10 to turn on and then the data stored in the second transfer buffer 440_2 can be transferred to the third memory block 410_13.

While FIG. 4 illustrates first transfer buffer 440_1 and fourth transfer buffer 440_4 and $7^{th}$ switch 420_7 and $24^{th}$ switch 420_24, those elements may be omitted in some embodiments in that the first transfer buffer 440_1 does not provide data to be transferred and the fourth transfer buffer 440_4 does not become a final destination for data transfer. According to embodiments of the present disclosure, via transfer buffer 440, data transfer between non-neighboring memory blocks can be performed without using global buffer 340, which also improves data transfer performance between non-neighboring memory blocks as well as overall throughput in executing neural network models on PIM accelerator 210. According to some embodiments of the present disclosure, data transfer between non-neighboring memory blocks may take H cycles, where H is the column difference between two non-neighboring memory blocks. For example, when data is transferred from first memory block 410_11 in a first column and to third memory block 410_13 in a third column, data transfer may take 2 cycles (e.g., $1^{st}$ cycle from first memory block 410_11 to second transfer buffer 440_2 and $2^{nd}$ cycle from second transfer buffer 440_2 to third memory block 410_13). When the data needs C cycles for each transfer from first memory block 410_11 to second transfer buffer 440_2 and from second transfer buffer 440_2 to third memory block 410_13 due to data size, the data transfer may take H×C cycles in total.

In some embodiments, data can be transferred in one direction in memory block assembly 310 through row and column data links 451 and 452 or transfer buffer 440. For example, in memory block assembly 310 of FIG. 4, data can be transferred from a left side to a right side (i.e., a direction from a first column to a second column) in FIG. 4 in memory block assembly 310 through row and column data links 451 and 452 or transfer buffer 440. When data needs to be transferred in other directions such as a direction from a right side to a left side or a direction parallel to a column direction, such data transfer can be performed via global buffer 340. For example, when moving data from one memory block (e.g., 410_11) to another memory block (410_21) located in a same column with the one memory block, controller 320 may be configured to perform data transfer via global buffer 340. When moving data from one memory block (e.g., 410_12) to another memory block (e.g., 410_11), controller 320 may be configured to perform such data transfer via global buffer 340. While embodiments in which data is transferred from a left side to a right side in memory block assembly 310 of FIG. 4 have been explained, it is appreciated that embodiments of the present disclosure can be implemented such that data can be transferred in any other direction.

According to embodiments of the present disclosure, a neural network model can be mapped to multiple memory blocks 410 and the memory blocks can process corresponding tasks such as training or inference in a pipelined manner to maximize system throughput. In some embodiments, memory tile 300 of FIG. 3 may include an instruction storage 350 configured to store instructions for executing a neural network model in memory block assembly 310 in a pipelined manner. Instruction storage 350 may store instructions of computations or data movements between memory blocks in memory block assembly 310. Controller 320 can be configured to access instruction storage 350 to retrieve the instructions stored in the instruction storage 350.

Instruction storage 35 may be configured to have a separate instruction segment assigned to each memory block. In some embodiments, an instruction segment assigned to corresponding memory block 410 can be divided into multiple sections, for example, three sections including RECEIVE section, COMPUTE section, and SEND section. RECEIVE section can store instructions of loading data for processing tasks assigned to corresponding memory block 410. Data may be transferred from other memory blocks 410, transfer buffer 440, global buffer 340, or host unit 220. For example, instructions regarding which source location the data is transferred from can be stored in RECEIVE section. COMPUTE section can store instructions for performing computation related operations of a neural network model. For example, instructions regarding which computational operation is performed can be stored in COMPUTE section. SEND section can store instructions of transferring output data to other memory blocks 410, transfer buffer 440, global buffer 340, or host unit 220. For example, instructions regarding which destination location the output data is transferred to can be stored in SEND section. In some embodiments, compiler can determine operands' source and destination addresses of corresponding instructions based on the memory layout in memory block assembly 310 and data layout mechanism.

Figure 5A:
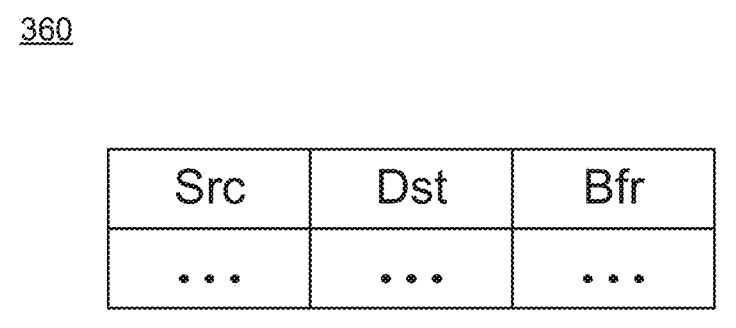

According to embodiments of the present disclosure, memory tile 300 can further include one or more control tables. In some embodiments, memory tile 300 can include a data transfer table for recording data transfer in memory tile 300. FIG. 5A illustrates an exemplary data transfer table 360 for recording data transfer in memory tile 300, consistent with embodiments of the present disclosure. Data transfer table 360 can be configured to record data transfers between memory blocks. In some embodiments, data transfer table 360 may be configured to record pending data transfers. As shown in FIG. 5A, data transfer table 360 can have a plurality of fields, for example, including a source field (Src), a destination field (Dst), and a buffer field (Bfr). Source field may include information indicating a memory block that sends data and destination field may include information indicating a memory block that receives the data. Buffer field may include information indicating which buffer (e.g., transfer buffer 440 or global buffer 340) the data is currently placed in. Controller 320 can schedule instructions during run time for executing a neural network model referring to information stored in data transfer table 360. According to some embodiments of the present disclosure, memory block 410 can perform one of computation or data transfer at a time and data size transferrable at one cycle is limited, one data transfer may take multiple cycles to be completed.

Figure 5B:
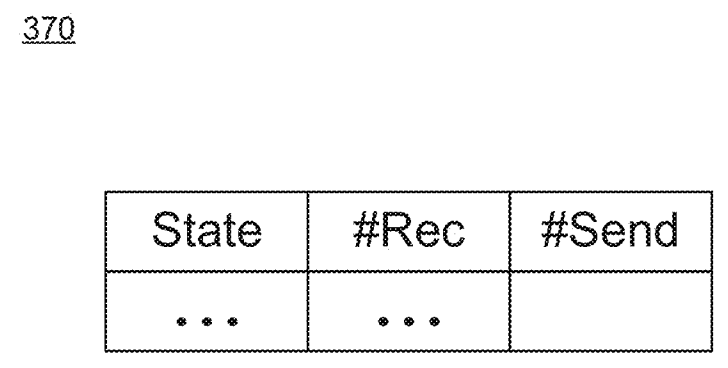
Figure 5C:
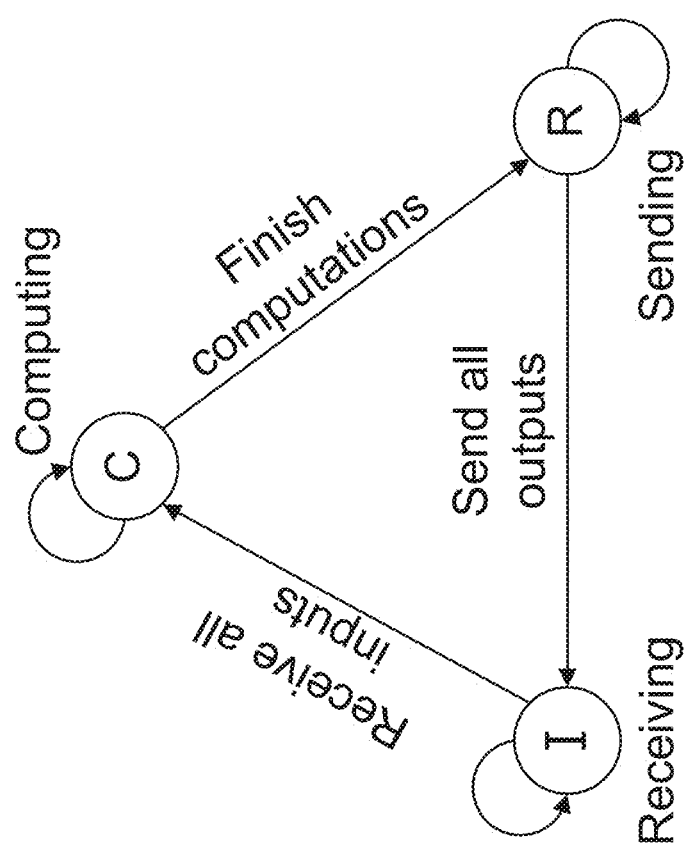
FIG. 5C illustrates an exemplary status transition cycle for a memory block, consistent with embodiments of the present disclosure.

In some embodiments, memory tile 300 can include a block table for indicating which status the corresponding memory block is in. FIG. 5B illustrates an exemplary block table 370 for recording a memory block status, consistent with embodiments of the present disclosure. As shown in FIG. 5B, block table 370 can have a state field (State) storing a current status of the corresponding memory block. According to some embodiments of the present disclosure, during execution of a neural network model, memory block 410 can have one of statuses, for example, including idle status (I), computing status (C), and ready status (R). Referring to FIG. 5C illustrating an exemplary status transition cycle for memory block 410, memory block's statuses will be explained. As shown in FIG. 5C, once memory block 410 receives all data for executing a certain computational operation, status of the memory block 410 changes from idle status (I) to computing status (C). Once memory block 410 completes the computational operations, status of the memory block 410 changes from computing status (C) to ready status (R). Once memory block 410 completes sending output data to a destination location, status of the memory block 410 changes from ready status (R) to idle status (I).

The status transition cycle can be repeated during execution of neural network models according to some embodiments of the present disclosure. In some embodiments, data transfers may be suspended when a destination memory is full. For example, when data is transferred to transfer buffer 440 and the transfer buffer 440 is full or lacks space for additional data transfer, the scheduled data transfer can be suspended until the transfer buffer 440 is emptied. In some embodiments, block table 370 of FIG. 5B may include fields recording a size of received data or a size of transferring data. In some embodiments, the size of received data can be recorded by counting an iteration number of transferring data. For example, when a data size transferable in one cycle is fixed or limited and data to be transferred is bigger than the data size transferable in one cycle, the data to be transferred can be divided into smaller portions each of which has equal to or smaller than the data size transferable in one cycle. Then, the divided smaller portions can be transferred from one location to another location during multiple cycles. Therefore, in some embodiments, counting an iteration number of transferring data can be used to determine the size of data transferred. As shown in FIG. 5B, block table 370 may have a field (# Rec) recording an iteration number of receiving data and a field (# Send) recording an iteration number of sending data.

Referring back to FIG. 3, controller 320 can be configured to schedule instructions (e.g., stored in memory storage 350) by coordinating hardware components in memory block assembly 310 for pipelined execution of a neural network model. According to some embodiments of the present disclosure, controller 320 can be configured to decode instructions, schedule instructions, and update control tables (e.g., data transfer table 360 and block table 370). During run time, controller 320 may periodically check control tables (e.g., data transfer table 360 or block table 370) to determine a next step for each memory block 410. For example, controller 320 can determine which status (e.g., idle status (I), computing status (C), or ready status (R)) memory block 410 will enter into in a next cycle by referring to data transfer table 360 or block table 370. After checking the next step, controller 320 may schedule instructions corresponding to the next step of memory block 410 by referring to instruction storage 350. Controller 320 may be configured to update data transfer table 360 or block table 370 according to the scheduling. According to some embodiments of the present disclosure, controller 320 may be configured to manage data communication using global buffer 340. In some embodiments, controller 320 may be configured to manage data communication to/from host unit 220 or host memory 221.

As discussed above, PIM architecture can be used in processing neural network models to address data movement overhead between processing units and memory units. It is important to mapping a neural network model on PIM architecture and to align data properly before processing computational operations such as addition, multiplication, etc. in memory to reduce unnecessary data movement in memory and to maximize utilization of a computing capacity of PIM architecture. The disclosed embodiments provide data layout optimization and node allocation techniques that can maximize parallelism and resource utilization in executing neural network models on PIM accelerator architecture and for reducing unnecessary data movement.

Figure 6:
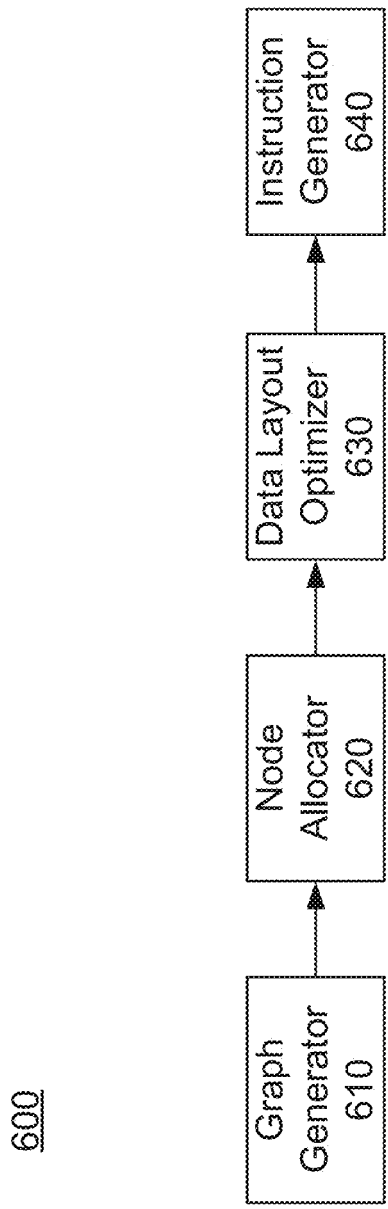
FIG. 6 illustrates a block diagram of an exemplary scheduler, consistent with embodiments of the present disclosure.

FIG. 6 illustrates a block diagram of an exemplary scheduler, consistent with embodiments of the present disclosure. As shown in FIG. 6, scheduler 600 can include a graph generator 610, a node allocator 620, and a data layout optimizer 630. In some embodiments, scheduler 600 may be implemented within a compiler. In some embodiments, scheduler 600 may be implemented in runtime libraries.

Graph generator 610 can compile a source code for a machine-learning model or neural network model to generate a computation graph representing the source code. In some embodiments, graph generator 610 may transform a machine-learning model or neural network model written in high-level language to generate a computation graph representing the machine-learning model or neural network model. In some embodiments, the computation graph can be generated from another high-level code initially compiled from the source code. In some embodiments, the machine-learning model may be a trained frozen machine-learning model. In some embodiments, graph generator 610 can generate a computation graph in a form of a Directed Acyclic Graph (DAG) by parsing a machine-learning model. In some embodiments, graph generator 610 may acquire a computation graph from other components. In some embodiments, graph generator 610 may acquire machine learning models of widely used formats such as Pytorch, ONNX, etc.

Figure 7A:
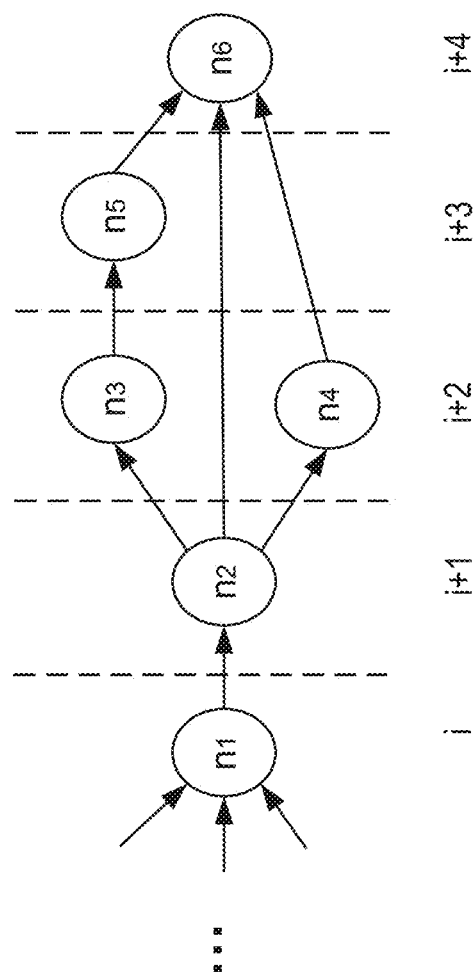
FIG. 7A illustrates an example of a neural network model, consistent with embodiments of the present disclosure.

FIG. 7A illustrates an example of a neural network model generated or acquired by graph generator 610, consistent with embodiments of the present disclosure. In machine learning or deep learning, a neural network model may be graphically represented by a computational graph or a data structure comprising nodes and edges organized as a directed acyclic graph (DAG). Nodes represent variables or computation operations, while edges represent data or tensor flow from one node to another. A node representing a computation operation can consume input data flowing in along an incoming edge to the node, while output data produced by the computation operation can flow out along an outgoing edge from the node. A typical machine-learning or deep-learning model may have thousands or even millions of variables and computation operations.

As shown in FIG. 7A, a computation graph includes a plurality of nodes $n_1$ to $n_6$ and edges connecting two nodes among the plurality of nodes $n_1$ to $n_6$. The computation graph shown in FIG. 7A can be a part of a certain neural network model. It should be noted that the computation graph of FIG. 7A is explanatory only and not restrictive, and thus embodiments of the present disclosure can be applied to a computation graph having any number of nodes and edges. A second node $n_2$ receives output data of a first node $n_1$. Output data of second node $n_2$ is provided to a third node $n_3$, a fourth node $n_4$, and a sixth node $n_6$. Output data of third node $n_3$ is provided to a fifth node $n_5$ and output data of fourth node $n_4$ is provided to sixth node $n_6$. Output data of fifth node $n_5$ is provided to sixth node $n_6$. In this example, sixth node $n_6$ receives output data from three nodes, i.e., second node $n_2$, fourth node $n_4$, and fifth node $n_5$. In some embodiments, nodes $n_1$ to $n_6$ can represent corresponding computational operations. Edges can represent dependency between two nodes connected by the corresponding edge. That is, a node at the end point of the edge can be processed only after a node at the start point of the edge is processed. For example, sixth node $n_6$ can be processed only after output data of second node $n_2$, fourth node $n_4$, and fifth node $n_5$ are provided to sixth node $n_6$.

Referring back to FIG. 6, node allocator 620 can allocate nodes of a neural network model on PIM accelerator (e.g., PIM accelerator 210 in FIG. 2A). In some embodiments, node allocator 620 can allocate tasks represented by nodes of a computational graph for a neural network model on memory blocks included in PIM memory block assembly (e.g., memory block assembly 310 in FIG. 3) of PIM accelerator. According to some embodiments of the present disclosure, node allocator 620 maps each node of a computation graph on a certain memory block (e.g., memory block 420 in FIG. 4) in PIM memory block assembly based on layer information of nodes and data dependency in the computation graph. In some embodiments, node allocator 620 may adopt a layer-aware algorithm for task allocation on PIM accelerator.

In the present disclosure, functions of node allocator 620 will be explained referring to a computation graph illustrated in FIG. 7A for illustration purposes. In some embodiments, node allocator 620 is configured to assign a layer number to each node of a computation graph. In some embodiments, node allocator 620 may assign a layer number based on a topological sort of a computation graph.

In some embodiments, a layer number of a certain node can be determined by increasing by one from a layer number of a previous node from which output data is provided to the certain node. For example, when we assume that first node $n_1$ has a layer number 1 in a computation graph in FIG. 7A, a layer number 2 can be assigned to second node $n_2$ because output data of first node $n_1$ is provided to second node $n_2$. A layer number 3 can be assigned to third node $n_3$ and fourth node $n_4$ because output data of second node $n_2$ is provided to third node $n_3$ and fourth node $n_4$. A layer number 4 can be assigned to fifth node $n_5$ because output data of third node $n_3$ having a layer number 3 is provided to fifth node $n_5$. Here, sixth node $n_6$ may be assigned to a layer number 5 because output data of fifth node $n_5$ having a layer number 4 is provided to sixth node $n_6$, to a layer number 4 because output data of fourth node $n_4$ having a layer number 3 is provided to sixth node $n_6$, or to a layer number 3 because output data of second node $n_2$ having a layer number 2 is provided to sixth node $n_6$. In some embodiments, when a certain node receives output data from multiple nodes, the highest number among layer number candidates can be assigned to the certain node as a layer number. For example, sixth node $n_6$ may be assigned to a layer number 5 that is the highest among the possible layer numbers 3, 4, and 5.

By assigning layer numbers as illustrated above, data movement overhead can be reduced by maintaining data dependency of the computation graph when executing a computation graph on PIM memory block assembly. As discussed before referring to FIG. 3 and FIG. 4, PIM memory block assembly may support data transfer in one direction (e.g., from left to right) through internal components such as data links (e.g., raw data link and column data link 451 and 452, transfer buffers (e.g., transfer buffer 440), and the like. When a receiving node is processed on a memory block positioned in the same column with a memory block on which a sending node is processed or when a receiving node is processed on a memory block positioned in an opposite direction to the data transfer direction through internal components from a memory block on which a sending node is processed, data movements for transferring output data from the sending node to the receiving node can cause significantly large overhead. Labeling schemes according to embodiments of the present disclosure may allow low cost data movements as well as maximal parallelism during execution of a neural network model on PIM accelerator.

In some embodiments, node allocator 620 can be configured to allocate nodes in a computation graph on memory blocks in PIM memory block assembly for processing operations represented by the nodes. In some embodiments, node allocator 620 can allocate nodes on memory blocks based on layer information for nodes, data dependency, hardware characteristics of PIM accelerator, or the like. According to some embodiments of the present disclosure, node allocator 620 can be configured to analyze a computation graph for a number of nodes, layer numbers for the nodes, dependency between nodes, etc. For example, node allocator 620 can figure out how many layers and nodes are included in a computation graph and what the highest number and lowest number for layer numbers. Node allocator 620 can take information about available memory blocks, the number of available rows and columns of available memory blocks, computational capacity of each available memory block, etc., as hardware characteristics of PIM accelerator.

Figure 7B:
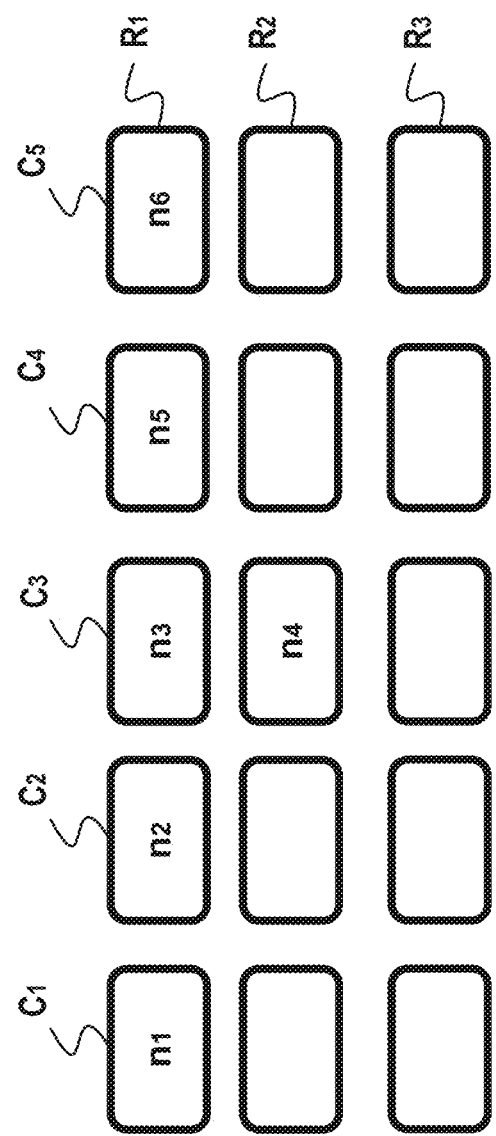
FIG. 7B illustrates a first example of node mapping for executing a neural network model of FIG. 7A in memory block assembly, consistent with embodiments of the present disclosure.

FIG. 7B illustrates a first example of node mapping for executing a neural network model of FIG. 7A in PIM memory block assembly, consistent with embodiments of the present disclosure. As shown in FIG. 7B, when a number of memory block columns and a number of memory blocks in one memory block column are sufficient for processing a computation graph, nodes in a computation graph can be assigned on memory blocks in the order of a layer number in a direction for which internal data transfer is supported (e.g., left to right in FIG. 4). For example, PIM memory block assembly illustrated in FIG. 7B comprises 5 columns that is greater than or equal to a total layer number (e.g., 5) of a computation graph of FIG. 7A and one column includes 3 memory blocks that is greater than or equal to the biggest node number (e.g., 2) included in each layer of a computation graph.

In a first example, first node $n_1$ having a layer number 1 of a computation graph can be assigned to a memory block in a first column $C_1$ and second node $n_2$ having a layer number 2 can be assigned to a memory block in a second column $C_2$. Output data of first node $n_1$ from the memory block in the first column $C_1$ can be transferred to the memory block in the second column $C_2$ for computing operations represented by second node $n_2$ via internal components such as transfer buffer, data links, and the like in the memory block assembly without interrupt of global buffer. Third and fourth nodes $n_3$ and $n_4$ having a layer number 3 can be assigned to memory blocks in a third column $C_3$. In FIG. 7B, because a memory block column includes three memory blocks, the two nodes $n_3$ and $n_4$ having the layer number 3 can be assigned to memory blocks in the same column. Similarly, fifth node $n_5$ having a layer number 4 can be assigned to a memory block in a fourth column $C_4$ and sixth node $n_6$ having a layer number 5 can be assigned to a memory block in a fifth column $C_5$ as shown in FIG. 7B. By mapping nodes of a computation graph to memory blocks in the order of a layer number in a direction for which internal data transfer is supported as shown in FIG. 7B, output data from executing operations of each node can be transferred to be used for executing operations of a subsequent node without interrupt of global buffer.

Figure 7C:
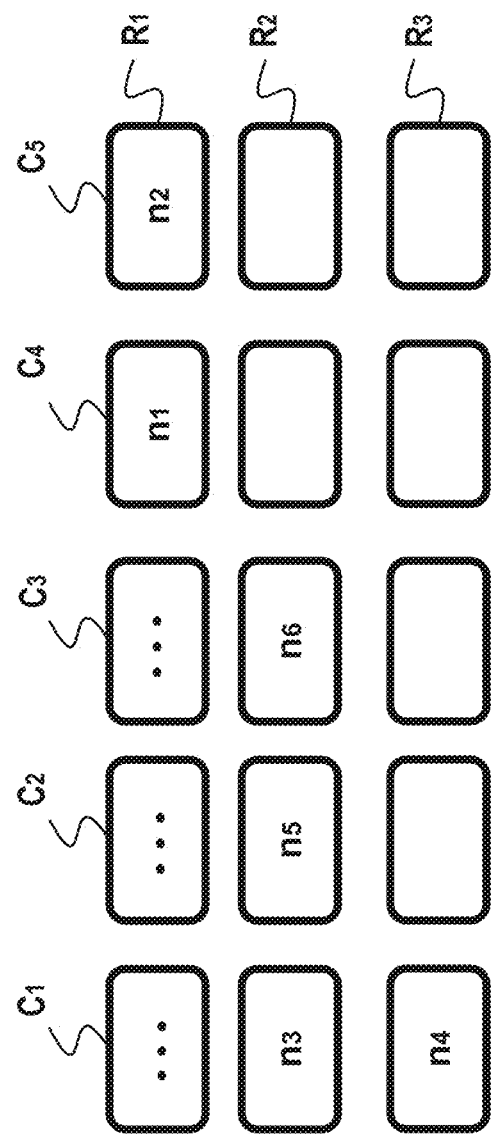
FIG. 7C illustrates a second example of node mapping for executing a neural network model of FIG. 7A in memory block assembly, consistent with embodiments of the present disclosure.

FIG. 7C illustrates a second example of node mapping for executing a neural network model of FIG. 7A in PIM memory block assembly, consistent with embodiments of the present disclosure. In the second example, it is assumed that a computation graph illustrated in FIG. 7A is a part of a bigger computation graph of which three nodes ahead of a first node $n_1$ are already assigned to memory blocks in a first row $R_1$ of each of a first column $C_1$ to a third column $C_3$. Similar to the first example illustrated in FIG. 7B, a first node $n_1$ having a subsequent layer number i to a layer number of a node assigned to a memory block in a first row $R_1$ and a third column $C_3$ can be assigned to a memory block in a fourth column $C_4$ and a second node $n_2$ having a layer number i+1 can be assigned to a memory block in a fifth column $C_5$.

In this example, as shown in FIG. 7C, a number of memory block columns is not sufficient for processing the bigger computation graph. In FIG. 7C, no memory block columns are available for unallocated nodes $n_3$ to $n_6$ in the direction for which internal data transfer is supported from the fifth column $C_5$. In some embodiments of the present disclosure, unallocated nodes can be assigned from the available leftmost memory block column (e.g., $C_1$) in the order of a layer number in a direction for which internal data transfer is supported. For example, third and fourth nodes $n_3$ and $n_4$ having a layer number i+2 can be assigned to available memory blocks in a first column $C_1$. If the first column $C_1$ does not have enough number of memory blocks available for third and fourth nodes $n_3$ and $n_4$, third node $n_3$ and fourth node $n_4$ may be assigned to two different columns respectively. Similarly, fifth node $n_5$ having a layer number i+3 can be assigned to a memory block in a second column $C_2$ and sixth node $n_6$ having a layer number i+4 can be assigned to a memory block in a third column $C_3$ as shown in FIG. 7C.

In the second example illustrated in FIG. 7C, output data of second node $n_2$ may be transferred from a memory block executing second node $n_2$ and positioned in a fifth column $C_5$ to memory blocks executing third node $n_3$ and fourth node $n_4$ and to a memory block executing sixth node $n_6$ via global buffer instead of memory block interconnection in PIM memory block assembly. This is because a direction of the transfer is opposite to a direction for which internal data transfer is supported. As discussed above, overhead of data transfer through global buffer is much larger than that of data transfer through internal components in the memory block assembly.

According to some embodiments of the present disclosure, node allocator 620 illustrated in FIG. 6 can be further configured to reduce data transfer overhead through global buffer when mapping nodes of a computation graph on memory blocks. In some embodiments, node allocator 620 can consider a number of data transfers of output data from nodes to be allocated on memory blocks in a right most column when mapping nodes on memory blocks in PIM memory block assembly. In some embodiments, node allocator 620 may analyze outgoing edges of nodes to be allocated on memory blocks in a rightmost column (e.g., fifth column $C_5$) and outgoing edges of nodes to be allocated on memory blocks in a second rightmost column (e.g., fourth column $C_4$). For example, node allocator 620 can determine that nodes having a layer number i+1 is to be allocated to a right most column, a number of nodes having a layer number i+1 is 1, and a number of outgoing edges from the node having layer number i+1 (e.g., second node $n_2$) is 3 from analyzing a computation graph of FIG. 7A. Node allocator 620 can also determine that a number of nodes having a layer number i is 1 and a number of outgoing edges from the node having layer number i (e.g., first node $n_1$) is 1 from analyzing a computation graph of FIG. 7A. In some embodiments, node allocator 620 may determine not to allocate second node $n_2$ to a right most column (e.g., $C_5$) but to allocate second node $n_2$ to a first column $C_1$ to reduce data transfer via global buffer from 3 times to once.

Figure 7D:
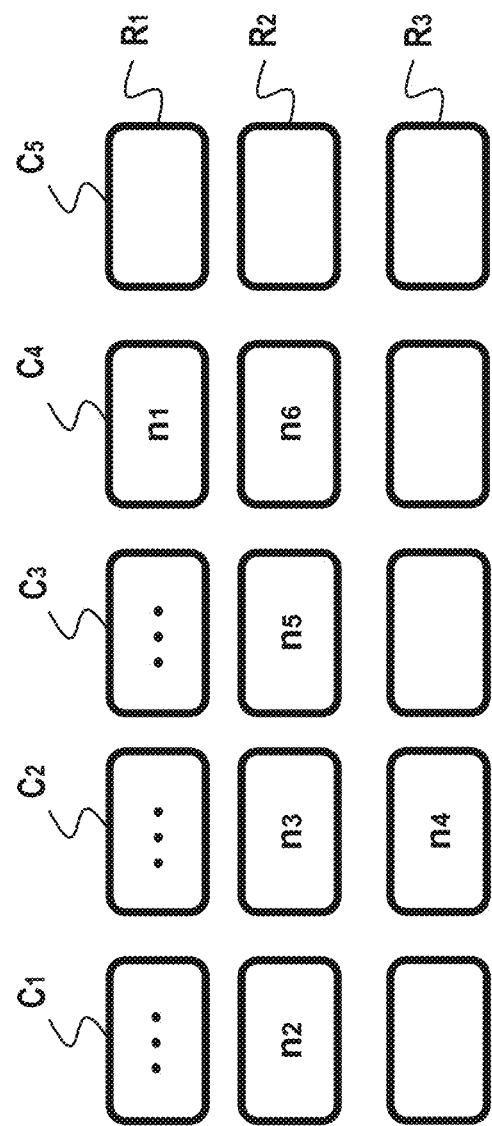
FIG. 7D illustrates a third example of node mapping for executing a neural network model of FIG. 7A in memory block assembly, consistent with embodiments of the present disclosure.

FIG. 7D illustrates a third example of node mapping for executing a neural network model of FIG. 7A in PIM memory block assembly, which is resulted from analysis and determination of node allocator 620 above. In FIG. 7D, node mapping that reduces data transfer overhead using global buffer compared to the second example of FIG. 7C is illustrated. Node mapping illustrated in FIG. 7D is different from node mapping illustrated in FIG. 7C in that a second node $n_2$ having a layer number i+1 is assigned to a memory block in a first column $C_1$ instead of a fifth column $C_2$. In FIG. 7D, third to sixth nodes $n_3$ to $n_6$ are assigned to memory blocks in the order of a layer number from a second columns $C_2$ to fourth columns $C_4$. In the third example, global buffer is used to transfer output data from a memory block computing first node $n_1$ to a memory block computing second node $n_2$. When comparing to a second example illustrated in FIG. 7C, data transfer overhead through global buffer is reduced in that output data of first node $n_1$ is provided only to second node $n_2$ while output data of second node $n_2$ is provided to three nodes $n_3$, $n_4$, and $n_6$.

It is noted that, in the third example, memory blocks in a fifth column $C_5$ are not utilized when executing a computation graph. In some embodiments, node allocator 620 can be configured to reallocate nodes on memory blocks by balancing data transfer overhead against memory utilization. For example, when cost for unutilized memory blocks due to node reallocation is bigger than cost for data transfer overhead without node reallocation, node allocator 620 may not perform the reallocation illustrated in FIG. 7D. In some embodiments, node allocator 620 can consider outgoing edges from nodes of three or more layers including a layer to be allocated to a right most column while the third example considering outgoing edges for two layers i and i+1 is explained with respect to FIG. 7D.

Referring back to FIG. 6, data layout optimizer 630 may be configured to determine data layout in a PIM block (e.g., PIM block 100 in FIG. 1) based on analysis of operations to be executed on the corresponding memory block and data dimensions of the corresponding operations, consistent embodiments of the present disclosure. According to some embodiments, data layout optimizer 630 can be configured to determine data layout in PIM block to improve computation parallelism and to maximize resource utilization when executing operations in the PIM block.

Optimizing data layout for computing vector-matrix multiplication type operations on PIM block may substantially improve computation parallelism and overall execution performance for executing a neural network model because many operations in a neural network model include vector-matrix multiplication type operations. According to some embodiments of the present disclosure, data layout optimizer 630 may be configured to optimize data layout in PIM block for computing vector-matrix multiplication type operations in the corresponding PIM block.

FIG. 8A illustrates an example of a vector-matrix multiplication operation. A vector-matrix multiplication operation illustrated in FIG. 8A can be represented as below:

$$H = I \times W \qquad \text{(Equation 1)}$$

Here, an output matrix H can be obtained by multiplying an input vector I and a weight matrix W. The input vector I includes $X_1$ to $X_4$ as its elements and the weight matrix W includes $W_{ij}$ as its element positioned at $i^{th}$ row and $j^{th}$ column of the weight matrix W. The output matrix H includes $H_1$ to $H_4$ as its elements that can be calculated as below:

$$H1 = X_1 W_{11} + X_2 W_{21} + X_3 W_{31} + X_4 W_{41} \quad \text{(Equation 2)}$$

$$H2 = X_1 W_{12} + X_2 W_{22} + X_3 W_{32} + X_4 W_{42} \quad \text{(Equation 3)}$$

$$H3 = X_1 W_{13} + X_2 W_{23} + X_3 W_{33} + X_4 W_{43} \quad \text{(Equation 4)}$$

$$H1 = X_1 W_{14} + X_2 W_{24} + X_3 W_{34} + X_4 W_{44} \quad \text{(Equation 5)}$$

Figure 8B:
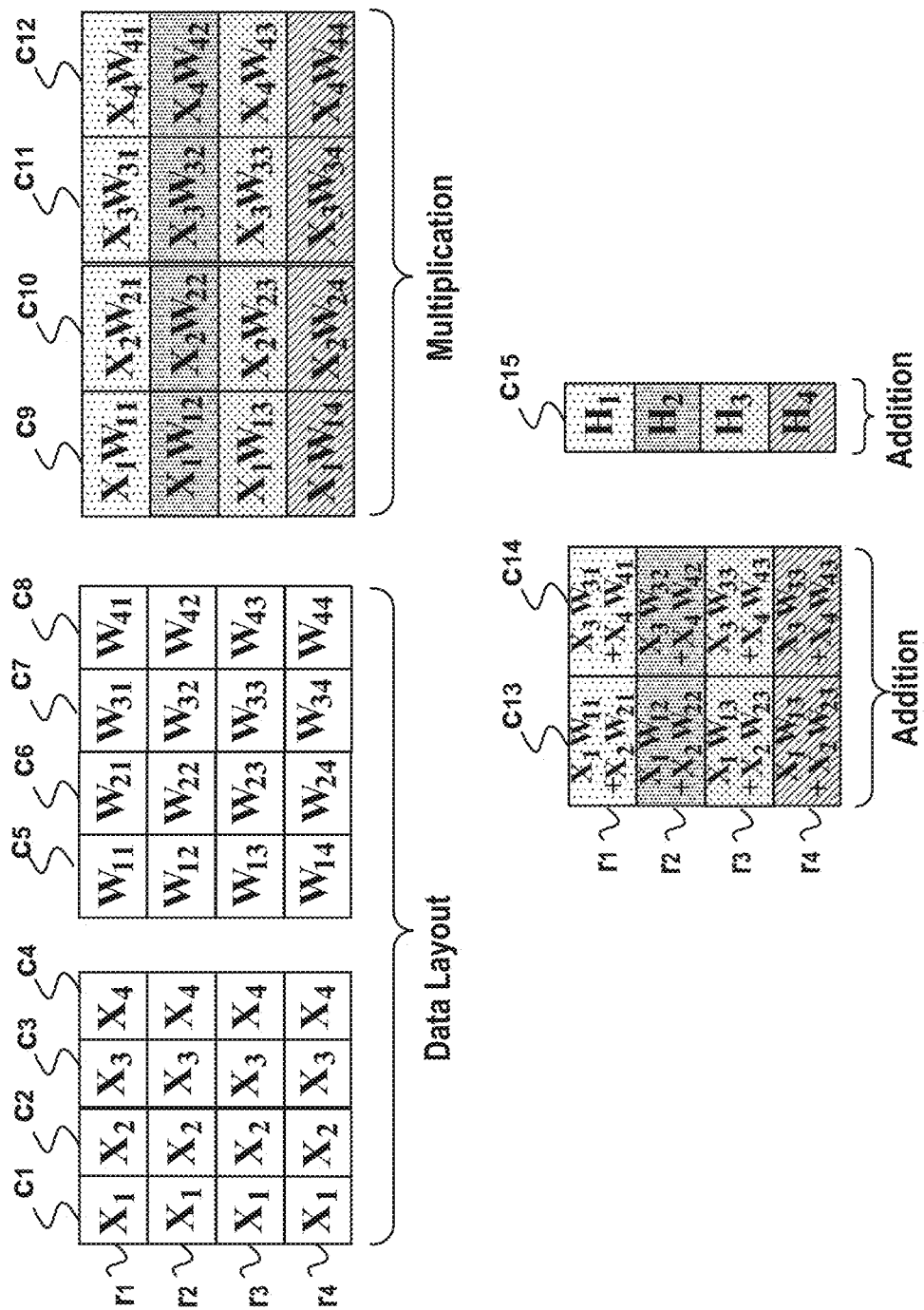
FIG. 8B illustrates a first example of data layout for executing a vector-matrix multiplication operation of FIG. 8A in processing in memory block, consistent with embodiments of the present disclosure.

Data layout optimizer 630 of FIG. 6 may be configured to determine data layout in PIM block (e.g., PIM block 100 of FIG. 1) for executing a vector-matrix multiplication operation. FIG. 8B illustrates a first example of data layout for executing a vector-matrix multiplication operation of FIG. 8A in a processing in memory block, consistent with embodiments of the present disclosure. To perform a vector-matrix multiplication operation in PIM block, data for input vector I and weight matrix W can be arranged in a suitable layout for column-wise vector calculation. As shown in FIG. 8B, each element of input vector I can be copied multiple times corresponding to the number of times that each element is multiplied for the multiplication operation. In Equation 2 to Equation 5, each element of input vector I is multiplied to elements of weight matrix W 4 times. Therefore, first element $X_1$ is copied 4 times in first column $c_1$ from first row $r_1$ to fourth row $r_4$, and similarly second element $X_2$ to fourth element $X_4$ can be arranged in second column $c_2$ to fourth column $c_4$. Corresponding to arrangement of input vector I, weight matrix W can be arranged in a transposed form. Elements of weight matrix W, which are multiplied to first element $X_1$ in first column $c_1$, are arranged in a next available column. For example, elements $W_{11}$, $W_{12}$, $W_{13}$, and $W_{14}$ each of which is multiplied to first element $X_1$ in Equations 2 to 5 can be arranged in fifth column $c_5$. Similarly, other elements of weight matrix W can be arranged in column $c_6$ to $c_8$ such that elements $W_{21}$, $W_{22}$, $W_{23}$, and $W_{24}$ to be multiplied to second element $X_2$ are arranged in sixth column $c_6$, elements $W_{31}$, $W_{32}$, $W_{33}$, and $W_{34}$ to be multiplied to third element $X_3$ are arranged in seventh column $c_7$, and elements $W_{41}$, $W_{42}$, $W_{43}$, and $W_{44}$ to be multiplied to third element $X_4$ are arranged in seventh column $c_8$. Via a data layout of input vector I and weight matrix W as shown in FIG. 8B, a vector-matrix multiplication operation can be transformed to column-wise vector operations. In a first example of FIG. 8B, a vector-matrix multiplication operation may include four vector multiplication operations between two columns from input vector I and weight matrix W respectively.

During computation of the vector-matrix multiplication, result data for multiplication between corresponding two columns can be stored in next available columns. For example, multiplication result data between first column $c_1$ and fifth column $c_5$ can be stored in ninth column $c_9$ and similarly other multiplication result data can be arranged in columns $c_{10}$ to $c_{12}$ such that multiplication result data between second column $c_2$ and sixth column $c_6$ is stored in tenth column $c_{10}$, multiplication result data between third column $c_3$ and seventh column $c_7$ is stored in eleventh column $c_{11}$, and multiplication result data between fourth column $c_4$ and eighth column $c_8$ is stored in twelfth column $c_{12}$. To obtain each element of output vector H, values in the same row of ninth column $c_9$ to twelfth column $c_{12}$ can be added. An addition operation can be performed by two steps. For example, values in ninth column $c_9$ and tenth column $c_{10}$ can be added element by element and stored in thirteenth column $c_{13}$ and similarly values in eleventh column $c_{11}$ and twelfth column $c_{12}$ can be added element by element and stored in fourteenth column $c_{14}$ as a first step. Then values in thirteenth column $c_{13}$ and fourteenth column $c_{14}$ can be added element by element and stored in fifteenth column $c_{15}$. A first value stored in first row $r_1$ of fifteenth column $c_{15}$ can correspond to first element $H_1$ of output matrix H and similarly second to fourth values stored in second row $r_2$ to fourth row $r_4$ of fifth column $c_{15}$ can correspond to second element $H_2$ to fourth element $H_4$ of output matrix H. As discussed above, computation of a vector-matrix multiplication operation can be performed through four times of vector multiplication operations and three times of addition operations in the first example shown in FIG. 8B.

According to some embodiments of the present disclosure, data layout optimizer 630 of FIG. 6 can be further configured to increase computation parallelism and to improve memory utilization. In some embodiments of the present disclosure, data layout optimizer 630 may be configured to determine data layout in PIM block for computing a vector-matrix multiplication operation based on adaptive vector folding. In some embodiments, data layout optimizer 630 can analyze available memory space in a corresponding memory block.

Figure 8C:
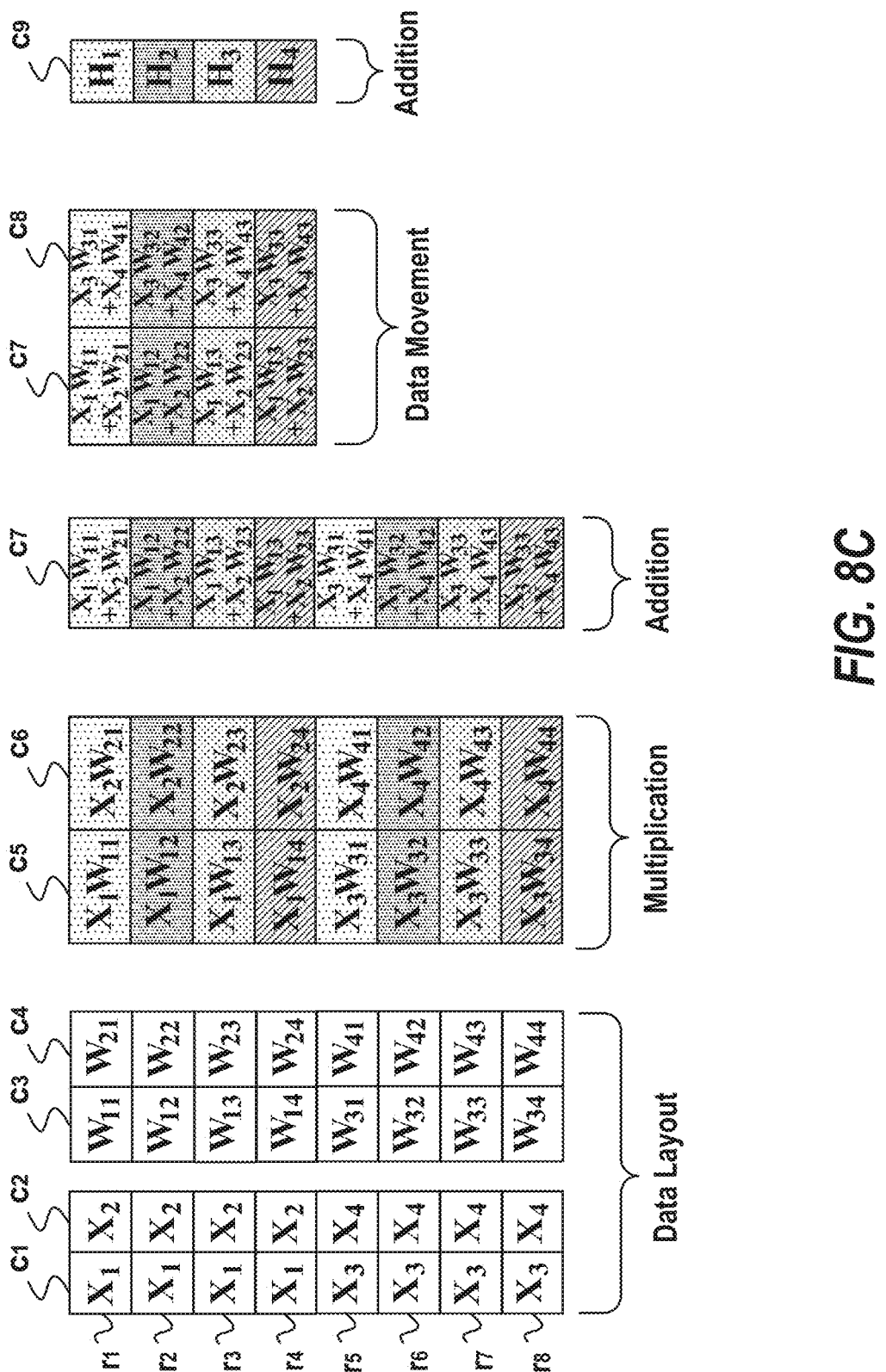
FIG. 8C illustrates a second example of data layout for executing a vector-matrix multiplication operation of FIG. 8A in processing in memory block, consistent with embodiments of the present disclosure.

FIG. 8C illustrates a second example of data layout for executing a vector-matrix multiplication operation of FIG. 8A in a processing in memory block, consistent with embodiments of the present disclosure. In FIG. 8C, data for computing a vector-matrix multiplication operation is arranged in PIM block based on adaptive vector folding. While 4 elements $X_1$ to $X_4$ of input vector I are arranged in four columns $c_1$ to $c_4$ in FIG. 8B, third element $X_3$ is arranged in fifth row $r_5$ to eighth row $r_8$ of first column $c_1$ in which first element $X_1$ is arranged in first row $r_1$ to fourth row $r_4$ and fourth element $X_4$ is arranged in fifth row $r_5$ to eighth row $r_8$ of second column $c_2$ in which second element $X_2$ is arranged in first row $r_1$ to fourth row $r_4$ in FIG. 8C. In other words, two vectors (e.g., one vector with four first elements $X_1$ and the other vector with four third elements $X_3$) are aligned in first column $c_1$ and similarly two vectors (e.g., one vector with four second elements $X_2$ and the other vector with four fourth elements $X_4$) are aligned in second column $c_2$ and therefore it is noted that 2-degree vector folding is used in FIG. 8C.

Corresponding to arrangement of input vector I, weight matrix W can be arranged such that elements of weigh matrix W are arranged in two columns such as third and fourth columns $c_3$ and $c_4$. For example, elements $W_{11}$, $W_{12}$, $W_{13}$, and $W_{14}$ (each of which is multiplied to first element $X_1$ in Equations 2 to 5) can be arranged in first row $r_1$ to fourth row $r_4$ of third column $c_3$ and elements $W_{31}$, $W_{32}$, $W_{33}$, and $W_{34}$ (each of which is multiplied to third element $X_3$) can be arranged in fifth row $r_5$ to eighth row $r_8$ of third column $c_3$. Elements $W_{21}$, $W_{22}$, $W_{23}$, and $W_{24}$ (each of which is multiplied to second element $X_2$ in Equations 2 to 5) can be arranged in first row $r_1$ to fourth row $r_4$ of fourth column $c_4$ and elements $W_{41}$, $W_{42}$, $W_{43}$, and $W_{44}$ (each of which is multiplied to fourth element $X_4$) can be arranged in fifth row $r_5$ to eighth row $r_8$ of third column $c_4$.

In FIG. 8C, result data for multiplication between corresponding two columns can be stored in next available columns. For example, multiplication result data between first column $c_1$ and third column $c_3$ can be stored in fifth column $c_5$ and similarly multiplication result data between second column $c_2$ and fourth column $c_4$ can be stored in sixth column $c_6$. To obtain each element of output vector H, values in the same row of fifth column $c_5$ and sixth column $c_6$ can be added and addition result data can be stored in next available column. For example, values in fifth column $c_5$ and sixth column $c_6$ can be added element by element and addition result data can be stored in seventh column $c_7$. In this example, because input vector I has been folded and arranged in two columns $c_1$ and $c_2$ each of which includes two elements of input vector I, the portion corresponding to the folded elements (e.g., $X_3$ and $X_4$) of the input vector I among the multiplication result data stored in column $c_7$ may be moved to a next available column. For example, values stored in fifth row $r_5$ to eighth row $r_8$ of seventh column $c_7$ can be moved to first to fourth rows $r_1$ to $r_4$ of eighth column $c_8$. Here, seventh column $c_7$ before and after the data movement is shown in FIG. 8C. Then values in seventh column $c_7$ and eighth column $c_8$ can be added element by element and the addition result data can be stored in ninth column $c_9$. A first value stored in first row $r_1$ of ninth column $c_9$ corresponds to first element $H_1$ of output matrix H and similarly second to fourth values stored in second row $r_2$ to fourth row $r_4$ of ninth column $c_9$ correspond to second element $H_2$ to fourth element $H_4$ of output matrix H.

A vector-matrix multiplication operation of FIG. 8A can be computed with two vector multiplication operations in FIG. 8C by using a vector folding scheme when arranging data in PIM block while an example of FIG. 8B uses four vector multiplication operations. As the degree of vector folding increases, the number of vector multiplication operations for computing a vector-matrix multiplication operation can be reduced. However, vector folding causes data movement in a memory block (e.g., data movement from seventh column $c_7$ to eighth column $c_8$ in FIG. 8C) for computing a vector-matrix multiplication operation. While a vector-matrix multiplication operation of FIG. 8A is computed with four vector multiplication operations (e.g., columns $c_9$ to $c_{12}$ in FIG. 8B) and three vector addition operations (e.g., columns $c_{13}$ to cis in FIG. 8B) without data movement in FIG. 8B, the vector-matrix multiplication operation can be computed with two vector multiplication operations (e.g., columns $c_5$ and $c_6$ in FIG. 8C), two vector addition operations (e.g., columns $c_7$ and $c_9$ in FIG. 8C), and one intra-block data movement (e.g., data movement from seventh column $c_7$ to eighth column $c_8$ in FIG. 8C) in a second example using a vector folding scheme illustrated in FIG. 8C. When comparing a first example illustrated in FIG. 8B and a second example illustrated in FIG. 8C, two-degree vector folding reduces two vector multiplication operations and one vector addition operation when computing a vector-matrix multiplication operation of FIG. 8A but causes one intra-block data movement.

It will be noted that intra-block data movement overhead is increased as the degree of vector folding increases. Based on the assumption that in-memory computations (e.g. multiplication operation and addition operation) introduce much larger overhead than intra-block data movement, using a vector folding scheme when arranging data for computing a vector-matrix multiplication operation can significantly improve efficiency and overall throughput. Moreover, memory space utilization rate can be increased by arranging data based on a vector folding scheme. For example, because memory cells in rows $r_5$ to $r_8$ can be utilized for computing a vector-matrix multiplication operation and thus less columns (e.g., columns $c_1$ to $c_9$) are used in FIG. 8C when arranging data based on a vector folding scheme compared to a first example illustrated in FIG. 8B, unused memory columns in a memory block may be used for other computational operations.

A vector folding scheme can be used for other computational operations, which can be represented as vector-matrix multiplication operations such as convolutional operations. A convolutional operation is widely used in machine learning and the cost for computing a convolutional operation is considerable when executing neural network models. It is challenging to efficiently execute a convolutional operation in PIM architecture taking into account that data reuse in input data is substantial.

Figure 9A:
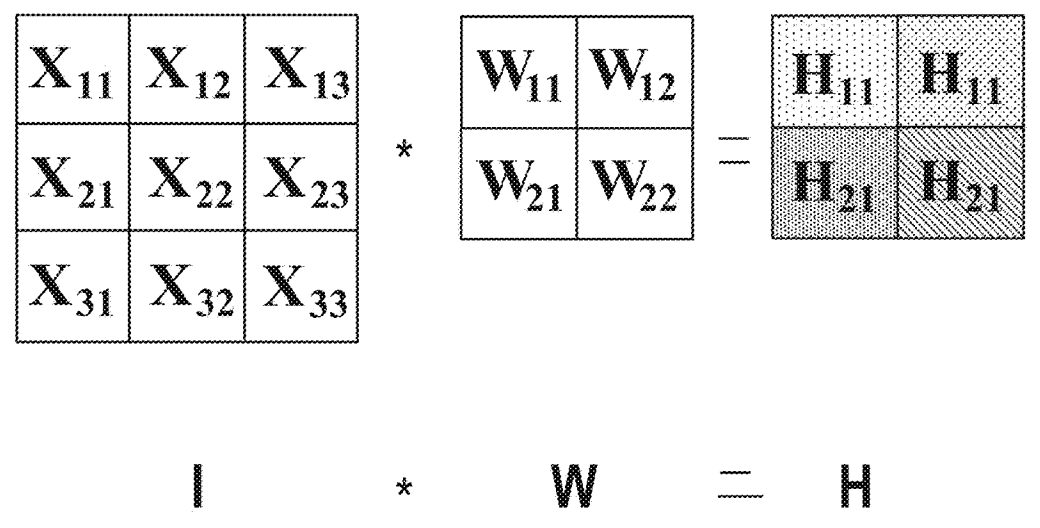

FIG. 9A illustrates an example of a convolution operation. A matrix convolution operation illustrated in FIG. 9A can be represented as below:

$$H=I*W \quad \text{(Equation 6)}$$

Here, an output matrix H can be obtained by multiplying each receptive field of an input matrix I with a weight matrix W element by element, which corresponds to a filter. In FIG. 9A, input matrix I with 3 rows and 3 columns and weight matrix W with 2 rows and 2 columns are illustrated as an example. In the present disclosure, embodiments where a convolution operation is performed with a window size 2×2 and a stride of 1 pixel will be explained for illustration purpose only. The input matrix I includes $X_{ij}$ as its element positioned at $i^{th}$ row and $j^{th}$ column of the input matrix W and the weight matrix W includes $W_{ij}$ as its element positioned at $i^{th}$ row and $j^{th}$ column of the weight matrix W. In this example, input matrix I includes four receptive fields each of which is multiplied to weight matrix W and produces its corresponding output element $H_{ij}$ of output matrix H. For example, input matrix I includes a first receptive field including elements $X_{11}$, $X_{12}$, $X_{21}$, and $X_{22}$, a second receptive field including elements $X_{12}$, $X_{13}$, $X_{22}$, and $X_{23}$, a third receptive field including elements $X_{21}$, $X_{22}$, $X_{31}$, and $X_{32}$, and a fourth receptive field including elements $X_{22}$, $X_{23}$, $X_{32}$, and $X_{33}$. The output matrix H includes $H_{ij}$ as its element positioned at $i^{th}$ row and $j^{th}$ column of the output matrix H that be calculated as below:

$$H_{11}=X_{11}W_{11}+X_{12}W_{12}+X_{21}W_{21}+X_{22}W_{22} \quad \text{(Equation 7)}$$

$$H_{12}=X_{12}W_{11}+X_{13}W_{12}+X_{22}W_{21}+X_{23}W_{22} \quad \text{(Equation 8)}$$

$$H_{21}=X_{21}W_{11}+X_{22}W_{12}+X_{31}W_{21}+X_{32}W_{22} \quad \text{(Equation 9)}$$

$$H_{22}=X_{22}W_{11}+X_{23}W_{12}+X_{32}W_{21}+X_{33}W_{22} \quad \text{(Equation 10)}$$

Figure 9B:
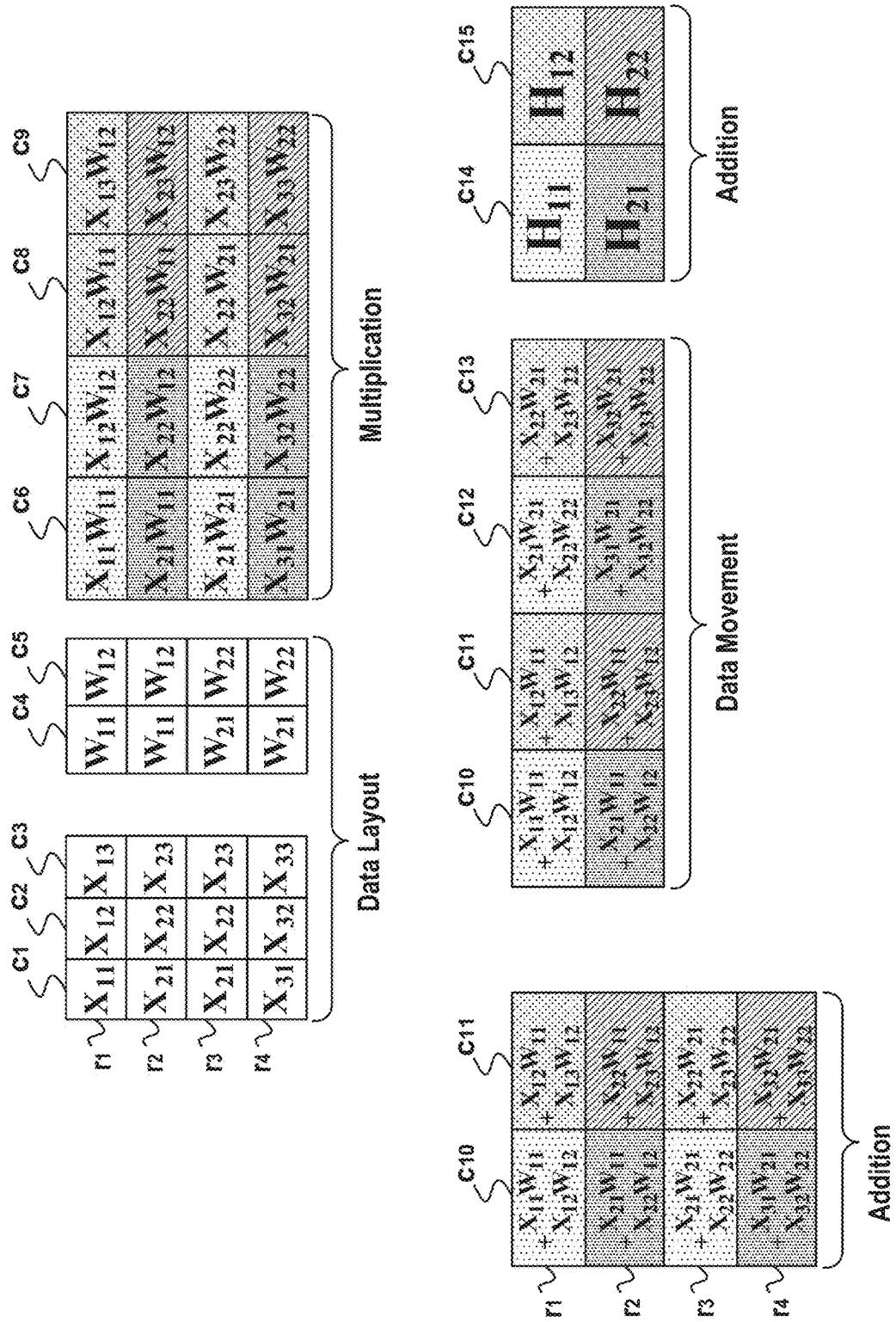
FIG. 9B illustrates exemplary data layout for executing a convolution operation of FIG. 9A in processing in memory block, consistent with embodiments of the present disclosure.

As shown in Equations 7 to 10, a convolution operation can be similarly transformed to a vector-matrix multiplication operation and thus data can be arranged in PIM block based on a vector folding scheme discussed with respect to FIG. 8C. Data layout optimizer 630 of FIG. 6 may be configured to determine data layout in PIM block for executing a convolution operation. FIG. 9B illustrates exemplary data layout for executing a convolution operation of FIG. 9A in PIM block, consistent with embodiments of the present disclosure. To perform a convolution operation in PIM block, data for input matrix I and weight matrix W can be arranged in a suitable layout for column-wise calculations. Data layout optimizer 630 may arrange input matrix I and weight matrix W in PIM block to improve parallelism and memory utilization in executing a convolution operation.

When arranging data for weight matrix W in PIM block, each row of weight matrix W can be copied multiple times corresponding to the number of receptive fields that are aligned in a column direction and extend over the same columns in a row direction. As discussed above, input matrix I includes two receptive fields aligned in a column direction and extending over the same columns in a row direction. For example, first and third receptive fields are aligned in a column direction and extending over the first and second columns of input matrix I and similarly second and fourth receptive fields are aligned in a column direction and extending over the second and third columns of input matrix I. Therefore, a first row of weight matrix W is copied twice and a second row of weight matrix W is copied twice when arranging data for weight matrix W in PIM block. While FIG. 9B illustrates that weight matrix W is arranged in fourth and fifth columns $c_4$ and $c_5$ for consistency in the disclosure, it will be appreciated that weight matrix W can be arranged before input matrix I. In FIG. 9B, two vectors (e.g., one vector with two elements $W_{11}$ and the other vector with two elements $W_{21}$) are aligned in fourth column $c_4$ and similarly two vectors (e.g., one vector with two elements $W_{12}$ and the other vector with two elements $W_{22}$) are aligned in fifth column $c_5$ and therefore it is noted that 2-degree vector folding is also used in FIG. 9B.

Corresponding to arrangement of weight matrix W, input matrix I can be arranged such that input matrix I are arranged in three columns such as first column $c_1$ to third columns $c_3$. For example, first row and second row of input matrix I each of which is multiplied to first row of weight matrix W can be arranged in first row $r_1$ and second row $r_4$ of first column $c_1$ to third columns $c_3$ and second row and third row of input matrix I each of which is multiplied to second row of weight matrix W can be arranged in third row $r_1$ and fourth row $r_4$ of first column $c_1$ to third columns $c_3$. As shown in FIG. 9B, second row of input matrix I is copied twice in second row $r_2$ and third row $r_3$ of first column $c_1$ to third columns $c_3$ because second row of input matrix I is multiplied to first row and second row of weight matrix I.

During computation of the convolution operation, result data for multiplication between corresponding two columns can be stored in next available columns. For example, multiplication result data between first column $c_1$ and fourth column $c_4$ can be stored in sixth column $c_6$, multiplication result data between second column $c_2$ and fifth column $c_5$ can be stored in seventh column $c_7$, multiplication result data between second column $c_2$ and fourth column $c_4$ can be stored in eighth column $c_8$, and multiplication result data between third column $c_3$ and fifth column $c_5$ can be stored in ninth column $c_9$. To obtain each element of output vector H, values in the same row of sixth column $c_6$ and seventh column $c_7$ can be added and addition result data can be stored in tenth column $c_{10}$ and values in the same row of eighth $c_8$ and ninth column $c_9$ can be added and addition result data can be stored in eleventh column $c_{11}$.

In this example, because weight matrix W has been folded and arranged in two columns $c_4$ and $c_5$ each of which includes two elements of weight matrix W, the portion corresponding to the folded elements (e.g., $W_{21}$ and $W_{22}$) of the weight matrix W among the multiplication result data stored in columns $c_{10}$ and $c_{11}$ may be moved to next available columns. For example, values stored in third and fourth rows $r_3$ and $r_4$ of columns $c_{10}$ and $c_{11}$ can be moved to first and second rows $r_1$ and $r_2$ of columns $c_{12}$ and $c_{13}$. Then values in tenth column $c_{10}$ and twelfth column $c_{12}$ can be added element by element and addition result data can be stored in fourteenth column $c_{14}$ and values in eleventh column $c_{11}$ and thirteenth column $c_{13}$ can be added element by element and addition result data can be stored in fifteenth column $c_{15}$. A value stored in first row $r_1$ of fourteenth column $c_{14}$ corresponds to element $H_{11}$ of output matrix H, a value stored in first row $r_1$ of fifteenth column $c_{15}$ corresponds to element $H_{12}$ of output matrix H, a value stored in second row $r_2$ of fourteenth column $c_{14}$ corresponds to element $H_{21}$ of output matrix H, and a value stored in second row $r_2$ of fifteenth column $c_{15}$ corresponds to element $H_{22}$ of output matrix H.

As discussed above, weight matrix W and input matrix I are arranged on PIM block by copying repetitive rows or elements in the same column with other rows or elements based on a vector folding scheme instead of copying the repetitive rows or elements in separate columns. Thereby, computation parallelism and memory utilization can be improved when executing a convolution operation in PIM block. Since a convolution operation usually uses multiple filters for each layer, computation parallelism can be even reinforced by arranging input matrix I as shown in FIG. 9B and arranging multiple filters in available columns as weight matrix W arrangement illustrated in FIG. 9B.

Referring back to FIG. 6, scheduler 600 may further include an instruction generator 640. Instruction generator 640 can be configured to generate instructions based on the determined node allocation from node allocator 620 and data layout from data layout optimizer 630. Instructions generated by instruction generator 640 can also include what kind of operations to be performed and how, when, and where to move data during execution of the operations for each PIM block. Instruction generator 640 is configured to generate instructions so that a target machine (e.g., PIM accelerator 210 of FIG. 2A) can execute the corresponding neural network model. The target machine can execute the corresponding neural network model according to sequence of instructions generated by instruction generator 640.

According to embodiments of the present disclosure, highly efficient neural network model scheduling on PIM architecture can be obtained. Embodiments of the present disclosure can provide optimum node allocation methods on PIM memory block assembly based on topological placements with compaction. Embodiments of the present disclosure can also provide optimum data layout methods on PIM block based on a vector folding schemes. According to embodiments of the present disclosure, data transfer efficiency can be obtained when executing a neural network model on PIM architecture. According to embodiments of the present disclosure, topological relationship in computation graph is used when allocating nodes on PIM memory assembly, which enables improving memory resource utilization and reducing data movement overhead. According to embodiments of the present disclosure, adaptive vector folding technology is used, which exploits column-wise computation parallelism in PIM block and thus maximizes computation parallelism for executing a neural network model. The adaptive vector folding scheme also enables reducing execution time for a neural network model. According to embodiments of the present disclosure, performance for executing a neural network model on PIM architecture can be significantly improved.

Figure 10:
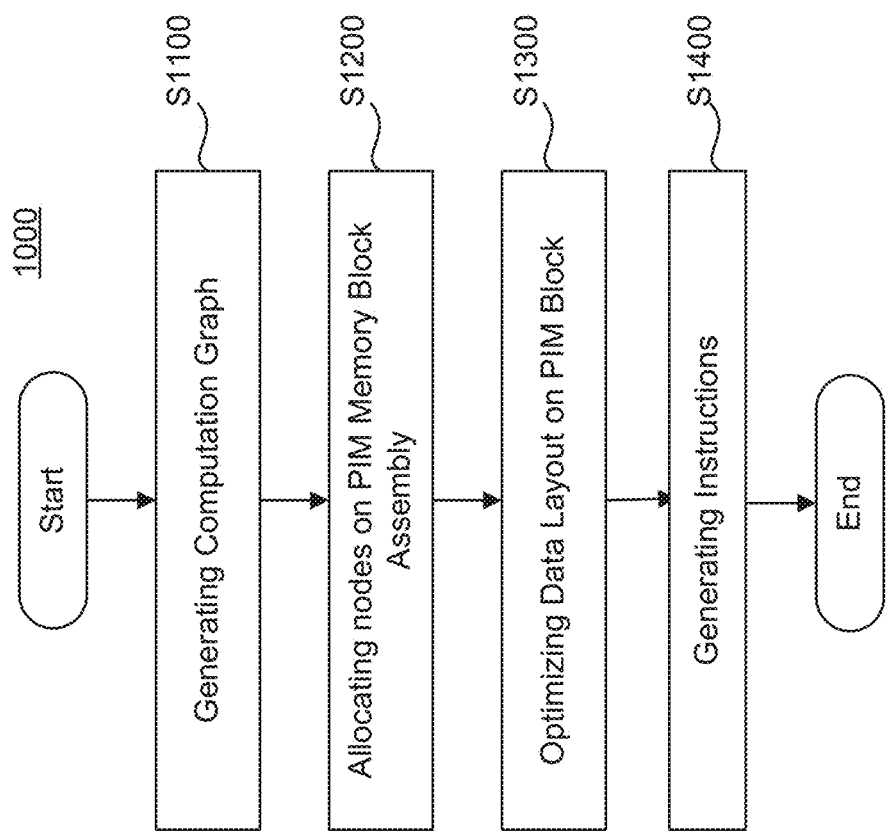
FIG. 10 illustrates an exemplary flow diagram for scheduling execution of a neural network model on processing in memory assembly, consistent with embodiments of the present disclosure.

FIG. 10 illustrates an exemplary flow diagram for scheduling execution of a neural network model on processing in memory assembly, consistent with embodiments of the present disclosure. For illustrative purposes, a method for scheduling execution of a neural network model on PIM memory block assembly will be described referring to FIG. 6 to FIG. 9B.

At step S1100, computation graph can be generated. Step S1100 can be performed by, for example, graph generator 610, among others. In some embodiments, a source code for a machine-learning model or neural network model can be compiled to generate a computation graph representing the source code. In some embodiments, a machine-learning model or neural network model written in high level language can be transformed to generate a computation graph representing the machine-learning model or neural network model. In some embodiments, the computation graph can be generated from another high-level code initially compiled from the source code. In some embodiments, the machine-learning model may be a trained frozen machine-learning model. In some embodiments, a computation graph in a form of a Directed Acyclic Graph (DAG) can be generated by parsing a machine-learning model. In some embodiments, a computation graph can be acquired from other components at step S1100. In some embodiments, machine learning models of widely used formats such as Pytorch, ONNX, etc can be acquired.

A computation graph shown in FIG. 7A, which includes a plurality of nodes $n_1$ to $n_6$ and edges connecting two nodes among the plurality of nodes $n_1$ to $n_6$, can be used as an example. The computation graph shown in FIG. 7A can be a part of a certain neural network model. It should be noted that the computation graph of FIG. 7A is explanatory only and not restrictive, and thus embodiments of the present disclosure can be applied to a computation graph having any number of nodes and edges.

As step S1200, nodes of a neural network model can be allocated on PIM accelerator (e.g., PIM accelerator 210 in FIG. 2A). Step S1200 can be performed by, for example, node allocator 620, among others. In some embodiments, tasks represented by nodes of a computational graph for a neural network model can be allocated on memory blocks included in PIM memory block assembly (e.g., memory block assembly 310 in FIG. 3) of PIM accelerator. According to some embodiments of the present disclosure, each node of a computation graph can be mapped on a certain memory block (e.g., memory block 420 in FIG. 4) in PIM memory block assembly based on layer information of nodes and data dependency in the computation graph. In some embodiments, a layer-aware algorithm can be used for task allocation on PIM accelerator.

In some embodiments, a layer number can be assigned to each node of a computation graph based on a topological sort of a computation graph. In some embodiments, a layer number of a certain node can be determined by increasing by one from a layer number of a previous node from which output data is provided to the certain node. For example, when we assume that first node $n_1$ has a layer number 1 in a computation graph in FIG. 7A, a layer number 2 can be assigned to second node $n_2$ because output data of first node $n_1$ is provided to second node $n_2$. A layer number 3 can be assigned to third node $n_3$ and fourth node $n_4$ because output data of second node $n_2$ is provided to third node $n_3$ and fourth node $n_4$. A layer number 4 can be assigned to fifth node $n_5$ because output data of third node $n_3$ having a layer number 3 is provided to fifth node $n_5$. Here, sixth node $n_6$ may be assigned to a layer number 5 because output data of fifth node $n_5$ having a layer number 4 is provided to sixth node $n_6$, to a layer number 4 because output data of fourth node $n_4$ having a layer number 3 is provided to sixth node $n_6$, or to a layer number 3 because output data of second node $n_2$ having a layer number 2 is provided to sixth node $n_6$. In some embodiments, when a certain node receives output data from multiple nodes, the highest number among layer number candidates can be assigned to the certain node as a layer number. For example, sixth node $n_6$ may be assigned to a layer number 5 that is the highest among the possible layer numbers 3, 4, and 5. By assigning layer numbers as illustrated above, data movement overhead can be reduced by maintaining data dependency of the computation graph when executing a computation graph on PIM memory block assembly.

According to some embodiments of the present disclosure, a computation graph for a number of nodes, layer numbers for the nodes, dependency between nodes, etc. can be analyzed. For example, how many layers and nodes are included in a computation graph and what the highest number and lowest number for layer numbers can be considered when allocating nodes. Information about available memory blocks, number of available rows and columns of available memory blocks, computational capacity of each available memory block, etc., as hardware characteristics of PIM accelerator can also be considered. FIG. 7B illustrates a first example of node mapping for executing a neural network model of FIG. 7A in PIM memory block assembly. As shown in FIG. 7B, when a number of memory block columns and a number of memory blocks in one memory block column are sufficient for processing a computation graph, nodes in a computation graph can be assigned on memory blocks in the order of a layer number in a direction for which internal data transfer is supported (e.g., left to right in FIG. 4).

In a first example, first node $n_1$ having a layer number 1 of a computation graph can be assigned to a memory block in a first column $C_1$ and second node $n_2$ having a layer number 2 can be assigned to a memory block in a second column $C_2$. Output data of first node $n_1$ from the memory block in the first column $C_1$ can be transferred to the memory block in the second column $C_2$ for computing operations represented by second node $n_2$ via internal components such as transfer buffer, data links, and the like in the memory block assembly without interrupt of global buffer. Third and fourth nodes $n_3$ and $n_4$ having a layer number 3 can be assigned to memory blocks in a third column $C_3$. Similarly, fifth node $n_5$ having a layer number 4 can be assigned to a memory block in a fourth column $C_4$ and sixth node $n_6$ having a layer number 5 can be assigned to a memory block in a fifth column $C_5$ as shown in FIG. 7B. By mapping nodes of a computation graph to memory blocks in the order of a layer number in a direction for which internal data transfer is supported as shown in FIG. 7B, output data from executing operations of each node can be transferred to be used for executing operations of a subsequent node without interrupt of global buffer.

FIG. 7C illustrates a second example of node mapping for executing a neural network model of FIG. 7A in PIM memory block assembly. In the second example, it is assumed that a computation graph illustrated in FIG. 7A is a part of a bigger computation graph of which three nodes ahead of a first node $n_1$ are already assigned to memory blocks in a first row $R_1$ of each of a first column $C_1$ to a third column $C_3$. Similar to the first example illustrated in FIG. 7B, a first node $n_1$ having a subsequent layer number i to a layer number of a node assigned to a memory block in a first row $R_1$ and a third column $C_3$ can be assigned to a memory block in a fourth column $C_4$ and a second node $n_2$ having a layer number i+1 can be assigned to a memory block in a fifth column $C_5$.

In this example, as shown in FIG. 7C, a number of memory block columns is not sufficient for processing the bigger computation graph. In FIG. 7C, no memory block columns are available for unallocated nodes $n_3$ to $n_6$ in the direction for which internal data transfer is supported from the fifth column $C_5$. In some embodiments of the present disclosure, unallocated nodes can be assigned from the available leftmost memory block column (e.g., $C_1$) in the order of a layer number in a direction for which internal data transfer is supported as shown in FIG. 7C.

In the second example illustrated in FIG. 7C, output data of second node $n_2$ may be transferred from a memory block executing second node $n_2$ and positioned in a fifth column $C_5$ to memory blocks executing third node $n_3$ and fourth node $n_4$ and to a memory block executing sixth node $n_6$ via global buffer instead of memory block interconnection in PIM memory block assembly. According to some embodiments of the present disclosure, data transfer overhead through global buffer can be reduced when mapping nodes of a computation graph on memory blocks. In some embodiments, a number of data transfer of output data from nodes to be allocated on memory blocks in a right most column can be considered when mapping nodes on memory blocks in PIM memory block assembly. In some embodiments, outgoing edges of nodes to be allocated on memory blocks in a rightmost column (e.g., fifth column $C_5$) and outgoing edges of nodes to be allocated on memory blocks in a second rightmost column (e.g., fourth column $C_4$) can be considered.

In FIG. 7D, node mapping that reduces data transfer overhead using global buffer compared to the second example of FIG. 7C is illustrated. Node mapping illustrated in FIG. 7D is different from node mapping illustrated in FIG. 7C in that a second node $n_2$ having a layer number i+1 is assigned to a memory block in a first column $C_1$ instead of a fifth column $C_2$. In FIG. 7D, third to sixth nodes $n_3$ to $n_6$ are assigned to memory blocks in the order of a layer number from a second columns $C_2$ to fourth columns $C_4$. In the third example, global buffer is used to transfer output data from a memory block computing first node $n_1$ to a memory block computing second node $n_2$. When comparing to a second example illustrated in FIG. 7C, data transfer overhead through global buffer is reduced in that output data of first node $n_1$ is provided only to second node $n_2$ while output data of second node $n_2$ is provided to three nodes $n_3$, $n_4$, and $n_6$.

In some embodiments, reallocating nodes on memory blocks can be determined by balancing data transfer overhead against memory utilization. For example, when cost for unutilized memory blocks due to node reallocation is bigger than cost for data transfer overhead without node reallocation, the reallocation illustrated in FIG. 7D may not be performed. In some embodiments, outgoing edges from nodes of three or more layers including a layer to be allocated to a right most column can be considered while the third example considering outgoing edges for two layers i and i+1 is explained with respect to FIG. 7D.

Referring back to FIG. 10, at step S1300, data layout in a PIM block (e.g., PIM block 100 in FIG. 1) can be determined based on analysis of operations to be executed on the corresponding memory block and data dimensions of the corresponding operations, consistent embodiments of the present disclosure. Step S1300 can be performed by, for example, data layout optimizer 630, among others. According to some embodiments, Data layout in PIM block can be performed to improve computation parallelism and to maximize resource utilization when executing operations in the PIM block. According to some embodiments of the present disclosure, data layout in PIM block can be optimized for computing vector-matrix multiplication type operations in the corresponding PIM block.

A vector-matrix multiplication operation illustrated in FIG. 8A can be represented as Equation 1. To perform a vector-matrix multiplication operation in PIM block, data for input vector I and weight matrix W can be arranged in a suitable layout for column-wise vector calculation. As shown in FIG. 8B, each element of input vector I can be copied multiple times corresponding to the number of times that each element is multiplied for the multiplication operation. Therefore, first element $X_1$ is copied 4 times in first column $c_1$ from first row $r_1$ to fourth row $r_4$, and similarly second element $X_2$ to fourth element $X_4$ can be arranged in second column $c_2$ to fourth column $c_4$. Corresponding to arrangement of input vector I, weight matrix W can be arranged in a transposed form. Elements of weight matrix W, which are multiplied to first element $X_1$ in first column $c_1$, are arranged in a next available column. For example, elements $W_{11}$, Wiz, $W_{13}$, and $W_{14}$ each of which is multiplied to first element $X_1$ in Equations 2 to 5 can be arranged in fifth column $c_5$. Similarly, other elements of weight matrix W can be arranged in column $c_6$ to $c_8$ such that elements $W_{21}$, $W_{22}$, $W_{23}$, and $W_{24}$ to be multiplied to second element $X_2$ are arranged in sixth column $c_6$, elements $W_{31}$, $W_{32}$, $W_{33}$, and $W_{34}$ to be multiplied to third element $X_3$ are arranged in seventh column $c_7$, and elements $W_{41}$, $W_{42}$, $W_{43}$, and $W_{44}$ to be multiplied to third element $X_4$ are arranged in seventh column $c_8$. As shown in FIG. 8B, computation of a vector-matrix multiplication operation can be performed through four times of vector multiplication operations and three times of addition operations in the first example based on the data layout above.

According to some embodiments of the present disclosure, data layout can be performed to increase computation parallelism and to improve memory utilization. In some embodiments of the present disclosure, data layout in PIM block for computing a vector-matrix multiplication operation can be determined based on adaptive vector folding. In some embodiments, available memory space in a corresponding memory block can be considered.

In FIG. 8C, data for computing a vector-matrix multiplication operation is arranged in PIM block based on adaptive vector folding. While 4 elements $X_1$ to $X_4$ of input vector I are arranged in four columns $c_1$ to $c_4$ in FIG. 8B, third element $X_3$ is arranged in fifth row $r_5$ to eighth row $r_8$ of first column $c_1$ in which first element $X_1$ is arranged in first row $r_1$ to fourth row $r_4$ and fourth element $X_4$ is arranged in fifth row $r_5$ to eighth row $r_8$ of second column $c_2$ in which second element $X_2$ is arranged in first row $r_1$ to fourth row $r_4$ in FIG. 8C. In other words, two vectors (e.g., one vector with four first elements $X_1$ and the other vector with four third elements $X_3$) are aligned in first column $c_1$ and similarly two vectors (e.g., one vector with four second elements $X_2$ and the other vector with four fourth elements $X_4$) are aligned in second column $c_2$ and therefore it is noted that 2-degree vector folding is used in FIG. 8C.

Corresponding to arrangement of input vector I, weight matrix W can be arranged such that elements of weigh matrix W are arranged in two columns such as third and fourth columns $c_3$ and $c_4$. For example, elements $W_{11}$, $W_{12}$, $W_{13}$, and $W_{14}$ each of which is multiplied to first element $X_1$ in Equations 2 to 5 can be arranged in first row $r_1$ to fourth row $r_4$ of third column $c_3$ and elements $W_{31}$, $W_{32}$, $W_{33}$, and $W_{34}$ each of which is multiplied to third element $X_3$ can be arranged in fifth row $r_5$ to eighth row $r_8$ of third column $c_3$. Elements $W_{21}$, $W_{22}$, $W_{23}$, and $W_{24}$ each of which is multiplied to second element $X_2$ in Equations 2 to 5 can be arranged in first row $r_1$ to fourth row $r_4$ of fourth column $c_4$ and elements $W_{41}$, $W_{42}$, $W_{43}$, and $W_{44}$ each of which is multiplied to fourth element $X_4$ can be arranged in fifth row $r_5$ to eighth row $r_8$ of third column $c_4$.

In FIG. 8C, result data for multiplication between corresponding two columns can be stored in next available columns. In this example, because input vector I has been folded and arranged in two columns $c_1$ and $c_2$ each of which includes two elements of input vector I, the portion corresponding to the folded elements (e.g., $X_3$ and $X_4$) of the input vector I among the multiplication result data stored in column $c_7$ may be moved to a next available column.

A vector-matrix multiplication operation of FIG. 8A can be computed with two vector multiplication operations in FIG. 8C by using a vector folding scheme when arranging data in PIM block while an example of FIG. 8B uses four vector multiplication operations. While a vector-matrix multiplication operation of FIG. 8A is computed with four vector multiplication operations (e.g., columns $c_9$ to $c_{12}$ in FIG. 8B) and three vector addition operations (e.g., columns $c_{13}$ to $c_{15}$ in FIG. 8B) without data movement in FIG. 8B, the vector-matrix multiplication operation can be computed with two vector multiplication operations (e.g., columns $c_5$ and $c_6$ in FIG. 8C), two vector addition operations (e.g., columns $c_7$ and $c_9$ in FIG. 8C), and one intra-block data movement (e.g., data movement from seventh column $c_7$ to eighth column $c_8$ in FIG. 8C) in a second example using a vector folding scheme illustrated in FIG. 8C. When comparing a first example illustrated in FIG. 8B and a second example illustrated in FIG. 8C, two-degree vector folding reduces two vector multiplication operations and one vector addition operation when computing a vector-matrix multiplication operation of FIG. 8A but causes one intra-block data movement. A vector folding scheme can be used for other computational operations, which can be represented as vector-matrix multiplication operations such as convolutional operations.

Referring back to FIG. 10, at step S1400, instructions can be generated based on the determined node allocation at step S1200 and data layout at step S1300. Instructions can also include what kind of operations to be performed and how, when, and where to move data during execution of the operations for each PIM block. In some embodiments, instructions can be generated so that a target machine (e.g., PIM accelerator 210 of FIG. 2A) can execute the corresponding neural network model. The target machine can execute the corresponding neural network model according to sequence of the generated instructions.

The embodiments may further be described using the following clauses:

1. A method for scheduling a computation graph on a processing in memory (PIM) enabled device comprising a memory block assembly, comprising:

allocating a first node of the computation graph on a first memory block of a first array of memory blocks in the memory block assembly; and allocating a second node of the computation graph on a second memory block of a second array of memory blocks in the memory block assembly, wherein output data of the first node is used for executing the second node, wherein the memory block assembly is configured to support data transfer from the first memory block to the second memory block via an internal data coupling in the memory block assembly.

2. The method of clause 1, further comprising:

assigning a first layer number to the first node and a second layer number to the second node based on dependency between the first node and the second node, wherein the second layer number is bigger than the first layer number.

3. The method of clause 2, wherein the computation graph further includes a third node of which output data is used for executing the second node and to which a third layer number is assigned, and wherein the second layer number is obtained by increasing the first layer number by 1 when the first layer number is bigger than the third layer number or by increasing the third layer number by 1 when the third layer number is bigger than the first layer number.

4. The method of any one of clauses 1-3, further comprising:

reallocating the second node on a third memory block of a third array of memory blocks in the memory block assembly, wherein the memory block assembly is configured to support data transfer from the first memory block to the third memory block via a global buffer shared by all memory blocks of the memory block assembly, and wherein a number of outgoing edges from one or more nodes that includes the second node and that are allocated to the second array of memory blocks is bigger than a number of outgoing edges from one or more nodes that includes the first node and that are allocated to the first array of memory blocks.

5. The method of any one of clauses 1-4, further comprising:

determining data layout for executing the first node on the first memory block based on vector folding, wherein the first memory block includes a memory cell array arranged in a plurality of rows and in a plurality of columns.

6. The method of clause 5, wherein the first node includes a vector-matrix multiplication operation between a vector and a matrix, and wherein a first element of the vector is arranged in a same column among the plurality of columns with a second element of the vector.

7. The method of clause 6, wherein the first element of the vector is copied multiple times in the same column among the plurality of columns.

8. An apparatus for scheduling a computation graph on a processing in memory (PIM) enabled device comprising a memory block assembly, comprising:

a memory storing a set of instructions; and one or more processors configured to execute the set of instructions to cause the apparatus to perform:

allocating a first node of the computation graph on a first memory block of a first array of memory blocks in the memory block assembly; and allocating a second node of the computation graph on a second memory block of a second array of memory blocks in the memory block assembly, wherein output data of the first node is used for executing the second node, wherein the memory block assembly is configured to support data transfer from the first memory block to the second memory block via an internal data coupling in the memory block assembly.

9. The apparatus of clause 8, wherein the one or more processors are configured to execute the set of instructions to cause the apparatus to further perform:

assigning a first layer number to the first node and a second layer number to the second node based on dependency between the first node and the second node, wherein the second layer number is bigger than the first layer number.

10. The apparatus of clause 9, wherein the computation graph further includes a third node of which output data is used for executing the second node and to which a third layer number is assigned, and wherein the second layer number is obtained by increasing the first layer number by 1 when the first layer number is bigger than the third layer number or by increasing the third layer number by 1 when the third layer number is bigger than the first layer number.

11. The apparatus of any one of clauses 8-10, wherein the one or more processors are configured to execute the set of instructions to cause the apparatus to further perform:

reallocating the second node on a third memory block of a third array of memory blocks in the memory block assembly, wherein the memory block assembly is configured to support data transfer from the first memory block to the third memory block via a global buffer shared by all memory blocks of the memory block assembly, and wherein a number of outgoing edges from one or more nodes that includes the second node and that are allocated to the second array of memory blocks is bigger than a number of outgoing edges from one or more nodes that includes the first node and that are allocated to the first array of memory blocks.

12. The apparatus of any one of clauses 8-11, wherein the one or more processors are configured to execute the set of instructions to cause the apparatus to further perform:

determining data layout for executing the first node on the first memory block based on vector folding, wherein the first memory block includes a memory cell array arranged in a plurality of rows and in a plurality of columns.

13. The apparatus of clause 12, wherein the first node includes a vector-matrix multiplication operation between a vector and a matrix, and wherein a first element of the vector is arranged in a same column among the plurality of columns with a second element of the vector.

14. The apparatus of clause 13, wherein the first element of the vector is copied multiple times in the same column among the plurality of columns.

15. A non-transitory computer readable medium that stores a set of instructions that is executable by at least one processor of a computing device to cause the computing device to perform a method for scheduling a computation graph on a processing in memory (PIM) enabled device comprising a memory block assembly, the method comprising:

allocating a first node of the computation graph on a first memory block of a first array of memory blocks in the memory block assembly; and allocating a second node of the computation graph on a second memory block of a second array of memory blocks in the memory block assembly, wherein output data of the first node is used for executing the second node, wherein the memory block assembly is configured to support data transfer from the first memory block to the second memory block via an internal data coupling in the memory block assembly.

16. The computer readable medium of clause 15, wherein the set of instructions that is executable by at least one processor of the computing device to cause the computing device to further perform:

assigning a first layer number to the first node and a second layer number to the second node based on dependency between the first node and the second node, wherein the second layer number is bigger than the first layer number.

17. The computer readable medium of clause 16, wherein the computation graph further includes a third node of which output data is used for executing the second node and to which a third layer number is assigned, and wherein the second layer number is obtained by increasing the first layer number by 1 when the first layer number is bigger than the third layer number or by increasing the third layer number by 1 when the third layer number is bigger than the first layer number.

18. The computer readable medium of any one of clauses 15-17, wherein the set of instructions that is executable by at least one processor of the computing device to cause the computing device to further perform:

reallocating the second node on a third memory block of a third array of memory blocks in the memory block assembly, wherein the memory block assembly is configured to support data transfer from the first memory block to the third memory block via a global buffer shared by all memory blocks of the memory block assembly, and wherein a number of outgoing edges from one or more nodes that includes the second node and that are allocated to the second array of memory blocks is bigger than a number of outgoing edges from one or more nodes that includes the first node and that are allocated to the first array of memory blocks.

19. The computer readable medium of any one of clauses 15-18, wherein the set of instructions that is executable by at least one processor of the computing device to cause the computing device to further perform:

determining data layout for executing the first node on the first memory block based on vector folding, wherein the first memory block includes a memory cell array arranged in a plurality of rows and in a plurality of columns.

20. The computer readable medium of clause 19, wherein the first node includes a vector-matrix multiplication operation between a vector and a matrix, and wherein a first element of the vector is arranged in a same column among the plurality of columns with a second element of the vector.

21. The computer readable medium of clause 20, wherein the first element of the vector is copied multiple times in the same column among the plurality of columns.

22. A terminal, comprising:
a processing in memory (PIM) enabled device comprising a memory block assembly; and
a host unit, which is communicatively coupled to the PIM enabled device, for scheduling a computation graph on the PIM enabled device, the host unit comprising:
a memory storing a set of instructions; and
one or more processors configured to execute the set of instructions to cause the host unit to perform:
allocating a first node of the computation graph on a first memory block of a first array of memory blocks in the memory block assembly; and
allocating a second node of the computation graph on a second memory block of a second array of memory blocks in the memory block assembly, wherein output data of the first node is used for executing the second node, wherein the memory block assembly is configured to support data transfer from the first memory block to the second memory block via an internal data coupling in the memory block assembly.

Embodiments herein include database systems, methods, and tangible non-transitory computer-readable media. The methods may be executed, for example, by at least one processor that receives instructions from a tangible non-transitory computer-readable storage medium. Similarly, systems consistent with the present disclosure may include at least one processor and memory, and the memory may be a tangible non-transitory computer-readable storage medium. As used herein, a tangible non-transitory computer-readable storage medium refers to any type of physical memory on which information or data readable by at least one processor may be stored. Examples include random access memory (RAM), read-only memory (ROM), volatile memory, non-volatile memory, hard drives, CD ROMs, DVDs, flash drives, disks, registers, caches, and any other known physical storage medium. Singular terms, such as "memory" and "computer-readable storage medium," may additionally refer to multiple structures, such a plurality of memories or computer-readable storage media. As referred to herein, a "memory" may comprise any type of computer-readable storage medium unless otherwise specified. A computer-readable storage medium may store instructions for execution by at least one processor, including instructions for causing the processor to perform steps or stages consistent with embodiments herein. Additionally, one or more computer-readable storage media may be utilized in implementing a computer-implemented method. The term "non-transitory computer-readable storage medium" should be understood to include tangible items and exclude carrier waves and transient signals.

As used herein, unless specifically stated otherwise, the term "or" encompasses all possible combinations, except where infeasible. For example, if it is stated that a database may include A or B, then, unless specifically stated otherwise or infeasible, the database may include A, or B, or A and B. As a second example, if it is stated that a database may include A, B, or C, then, unless specifically stated otherwise or infeasible, the database may include A, or B, or C, or A and B, or A and C, or B and C, or A and B and C.

In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the invention disclosed herein. It is intended that the specification and examples be considered as exemplary only, with a true scope and spirit of the invention being indicated by the following claims. It is also intended that the sequence of steps shown in figures are only for illustrative purposes and are not intended to be limited to any particular sequence of steps. As such, those skilled in the art can appreciate that these steps can be performed in a different order while implementing the same method.

What is claimed is:

1. A method for scheduling a computation graph on a processing in memory (PIM) enabled device comprising a memory block assembly, comprising:
    allocating a first node of the computation graph on a first memory block of a first array of memory blocks in the memory block assembly;
    allocating a second node of the computation graph on a second memory block of a second array of memory blocks in the memory block assembly, wherein output data of the first node is used for executing the second node; and
    assigning a first layer number to the first node and a second layer number to the second node based on dependency between the first node and the second node, wherein the second layer number is bigger than the first layer number,
    wherein the memory block assembly is configured to support data transfer from the first memory block to the second memory block via an internal data coupling in the memory block assembly,
    wherein the computation graph further includes a third node of which output data is used for executing the second node and to which a third layer number is assigned, and
    wherein the second layer number is obtained by increasing the first layer number by 1 when the first layer number is bigger than the third layer number or by increasing the third layer number by 1 when the third layer number is bigger than the first layer number.

2. The method of claim 1, further comprising:
    reallocating the second node on a third memory block of a third array of memory blocks in the memory block assembly,
    wherein the memory block assembly is configured to support data transfer from the first memory block to the third memory block via a global buffer shared by all memory blocks of the memory block assembly, and
    wherein a number of outgoing edges from one or more nodes that includes the second node and that are allocated to the second array of memory blocks is bigger than a number of outgoing edges from one or more nodes that includes the first node and that are allocated to the first array of memory blocks.

3. The method of claim 1, further comprising:
    determining data layout for executing the first node on the first memory block based on vector folding,
    wherein the first memory block includes a memory cell array arranged in a plurality of rows and in a plurality of columns.

4. The method of claim 3, wherein the first node includes a vector-matrix multiplication operation between a vector and a matrix, and
    wherein a first element of the vector is arranged in a same column among the plurality of columns with a second element of the vector.

5. The method of claim 4, wherein the first element of the vector is copied multiple times in the same column among the plurality of columns.

6. The method of claim 1, wherein the second array of memory blocks is adjacent to the first array of memory blocks in the memory block assembly.

7. An apparatus for scheduling a computation graph on a processing in memory (PIM) enabled device comprising a memory block assembly, comprising:
    a memory storing a set of instructions; and
    one or more processors configured to execute the set of instructions to cause the apparatus to perform:
        allocating a first node of the computation graph on a first memory block of a first array of memory blocks in the memory block assembly;
        allocating a second node of the computation graph on a second memory block of a second array of memory blocks in the memory block assembly, wherein output data of the first node is used for executing the second node; and
        assigning a first layer number to the first node and a second layer number to the second node based on dependency between the first node and the second node, wherein the second layer number is bigger than the first layer number, wherein the memory block assembly is configured to support data transfer from the first memory block to the second memory block via an internal data coupling in the memory block assembly, wherein the computation graph further includes a third node of which output data is used for executing the second node and to which a third layer number is assigned, and wherein the second layer number is obtained by increasing the first layer number by 1 when the first layer number is bigger than the third layer number or by increasing the third layer number by 1 when the third layer number is bigger than the first layer number.

8. The apparatus of claim 7, wherein the one or more processors are configured to execute the set of instructions to cause the apparatus to further perform:

reallocating the second node on a third memory block of a third array of memory blocks in the memory block assembly, wherein the memory block assembly is configured to support data transfer from the first memory block to the third memory block via a global buffer shared by all memory blocks of the memory block assembly, and wherein a number of outgoing edges from one or more nodes that includes the second node and that are allocated to the second array of memory blocks is bigger than a number of outgoing edges from one or more nodes that includes the first node and that are allocated to the first array of memory blocks.

9. The apparatus of claim 7, wherein the one or more processors are configured to execute the set of instructions to cause the apparatus to further perform:

determining data layout for executing the first node on the first memory block based on vector folding, wherein the first memory block includes a memory cell array arranged in a plurality of rows and in a plurality of columns.

10. The apparatus of claim 9, wherein the first node includes a vector-matrix multiplication operation between a vector and a matrix, and wherein a first element of the vector is arranged in a same column among the plurality of columns with a second element of the vector.

11. The apparatus of claim 10, wherein the first element of the vector is copied multiple times in the same column among the plurality of columns.

12. A non-transitory computer readable medium that stores a set of instructions that is executable by at least one processor of a computing device to cause the computing device to perform a method for scheduling a computation graph on a processing in memory (PIM) enabled device comprising a memory block assembly, the method comprising:

allocating a first node of the computation graph on a first memory block of a first array of memory blocks in the memory block assembly;

allocating a second node of the computation graph on a second memory block of a second array of memory blocks in the memory block assembly, wherein output data of the first node is used for executing the second node; and assigning a first layer number to the first node and a second layer number to the second node based on dependency between the first node and the second node, wherein the second layer number is bigger than the first layer number, wherein the memory block assembly is configured to support data transfer from the first memory block to the second memory block via an internal data coupling in the memory block assembly, wherein the computation graph further includes a third node of which output data is used for executing the second node and to which a third layer number is assigned, and wherein the second layer number is obtained by increasing the first layer number by 1 when the first layer number is bigger than the third layer number or by increasing the third layer number by 1 when the third layer number is bigger than the first layer number.

13. The computer readable medium of claim 12, wherein the set of instructions that is executable by at least one processor of the computing device to cause the computing device to further perform:

reallocating the second node on a third memory block of a third array of memory blocks in the memory block assembly, wherein the memory block assembly is configured to support data transfer from the first memory block to the third memory block via a global buffer shared by all memory blocks of the memory block assembly, and wherein a number of outgoing edges from one or more nodes that includes the second node and that are allocated to the second array of memory blocks is bigger than a number of outgoing edges from one or more nodes that includes the first node and that are allocated to the first array of memory blocks.

14. The computer readable medium of claim 12, wherein the set of instructions that is executable by at least one processor of the computing device to cause the computing device to further perform:

determining data layout for executing the first node on the first memory block based on vector folding, wherein the first memory block includes a memory cell array arranged in a plurality of rows and in a plurality of columns.

15. The computer readable medium of claim 14, wherein the first node includes a vector-matrix multiplication operation between a vector and a matrix, and wherein a first element of the vector is arranged in a same column among the plurality of columns with a second element of the vector.

16. The computer readable medium of claim 15, wherein the first element of the vector is copied multiple times in the same column among the plurality of columns.

17. A terminal, comprising:

a processing in memory (PIM) enabled device comprising a memory block assembly; and a host unit, which is communicatively coupled to the PIM enabled device, for scheduling a computation graph on the PIM enabled device, the host unit comprising:

a memory storing a set of instructions; and one or more processors configured to execute the set of instructions to cause the host unit to perform:

allocating a first node of the computation graph on a first memory block of a first array of memory blocks in the memory block assembly;

allocating a second node of the computation graph on a second memory block of a second array of memory blocks in the memory block assembly, wherein output data of the first node is used for executing the second node; and assigning a first layer number to the first node and a second layer number to the second node based on dependency between the first node and the second node, wherein the second layer number is bigger than the first layer number, wherein the memory block assembly is configured to support data transfer from the first memory block to the second memory block via an internal data coupling in the memory block assembly, wherein the computation graph further includes a third node of which output data is used for executing the second node and to which a third layer number is assigned, and wherein the second layer number is obtained by increasing the first layer number by 1 when the first layer number is bigger than the third layer number or by increasing the third layer number by 1 when the third layer number is bigger than the first layer number.

\* \* \* \* \*